(12) United States Patent
Aphek et al.

(10) Patent No.: US 7,920,255 B2
(45) Date of Patent: Apr. 5, 2011

(54) DISTRIBUTED JAMMER SYSTEM

(75) Inventors: Ori Aphek, Givataim (IL); Gil Tidhar, Modiin (IL); Tal Goichman, Kiryat Ono (IL)

(73) Assignees: Elta Systems Ltd., Ashdod (IL); Optigo Systems Ltd., Lod (IL)

( * ) Notice: Subject to any disclaimer, the term of this patent is extended or adjusted under 35 U.S.C. 154(b) by 163 days.

(21) Appl. No.: 12/296,441

(22) PCT Filed: Apr. 10, 2007

(86) PCT No.: PCT/IL2007/000451
§ 371 (c)(1),
(2), (4) Date: Oct. 8, 2008

(87) PCT Pub. No.: WO2007/116403
PCT Pub. Date: Oct. 18, 2007

(65) Prior Publication Data
US 2009/0224958 A1   Sep. 10, 2009

(30) Foreign Application Priority Data

Apr. 10, 2006  (IL) .......................................... 174888
Apr. 1, 2007   (IL) .......................................... 182382

(51) Int. Cl.
  *G01B 11/26* (2006.01)
(52) U.S. Cl. ................................................. 356/139.04
(58) Field of Classification Search ........ 356/3.01–3.15, 356/4.01–4.1, 5.01–5.15, 6–28.5, 139.01–139.1
See application file for complete search history.

(56) References Cited

U.S. PATENT DOCUMENTS

| 5,628,196 | A | 5/1997 | Farmer |
| 6,369,885 | B1 | 4/2002 | Brown et al. |
| 6,792,028 | B2 | 9/2004 | Cook et al. |
| 6,873,893 | B1 | 3/2005 | Sanghera et al. |
| 2003/0142005 | A1 | 7/2003 | Bar-Avi et al. |
| 2007/0206177 | A1* | 9/2007 | Anschel et al. .................. 356/28 |
| 2008/0018520 | A1* | 1/2008 | Moreau .......................... 342/14 |

FOREIGN PATENT DOCUMENTS

| FR | 2 870 333 A1 | 11/2005 |
| WO | WO2004109323 | * 12/2004 |
| WO | WO 2005/109031 A2 | 11/2005 |

(Continued)

OTHER PUBLICATIONS

Chow et al., "Protecting Commercial Aviation Against the Shoulder-Fired Missile Threat," *RAND Corporation*, 2005, ISBN 0-8330-3718-8.

(Continued)

*Primary Examiner* — Thomas H Tarcza
*Assistant Examiner* — Luke D Ratcliffe
(74) *Attorney, Agent, or Firm* — Oliff & Berridge, PLC

(57) ABSTRACT

According to some embodiments of the invention a laser directed infrared countermeasures system (hereinafter: "LDIRCM system") is mountable on a platform. According to some embodiments of the invention, a LDIRCM system may include a plurality of sector units. Each sector unit may include at least one laser unit and a laser guidance module. The laser unit may be adapted to generate a laser beam or laser energy that is intended for jamming a guidance system of a threat. The laser unit may be coupled to the laser guidance module. The laser guidance module may be adapted to steer at least a laser beam generated by the laser unit towards a threat.

25 Claims, 7 Drawing Sheets

FOREIGN PATENT DOCUMENTS

| WO | WO2005109031 | * | 11/2005 |
|---|---|---|---|
| WO | WO 2007/063542 A2 | | 6/2007 |

OTHER PUBLICATIONS

OPTRA, Inc., "Multi-Wavelength Beam Steering for Infrared Countermeasures," *NAVY SBIR Topic N01-169*, pp. 1-7, Jan. 30, 2004.

Alpes Lasers SA, "List of pulsed FP lasers," (Laser catalog No. RT-P-FP-250-2140), obtained from website: www.alpeslasers.com/lasers-on-stock/lasersSPECfp.html, on Jul. 9, 2009.

Global Security Organization, "Infrared Countermeasures Systems," obtained from website: www.globalsecurity.org/military/systems/aircraft/systems/ircm.html, Apr. 27, 2005.

Morger et al., "New Laser Portends Breakthrough in Directable IRCM Systems," obtained from website: www.lockheedmartin.com/news/press_releases/2000/NewLaserPortendsBreakthroughInDirec.html, Apr. 27, 2005.

Lockheed Martin Company, "Steered Agile Beam Program Open Session Summary," *STAB Kickoff Meeting*, Aug. 8, 2000.

Koehler, Elka., "Low Cost Infrared Countermeasures (IRCM) Aircraft Protection Systems," *Raytheon Missile Systems*, Oct. 6, 2005.

Faist et al., "Quantum Cascade Laser," *SCIENCE*, vol. 264, Apr. 22, 1994, pp. 553-556.

* cited by examiner

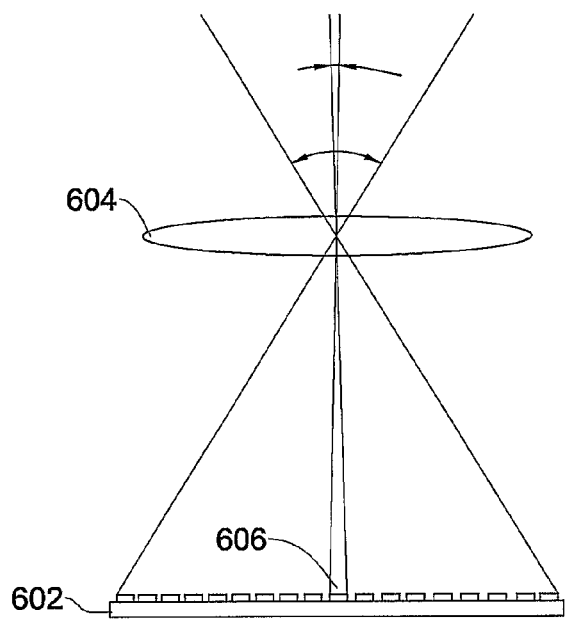
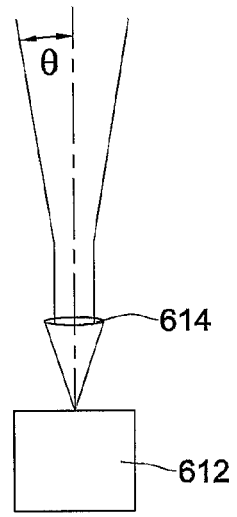
FIG. 6A                FIG. 6B
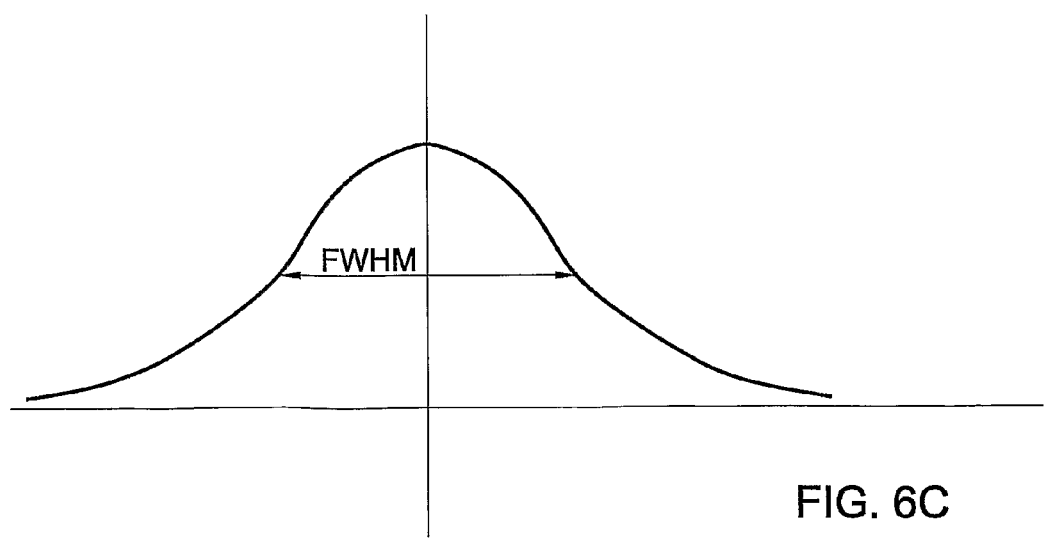
FIG. 6C

DISTRIBUTED JAMMER SYSTEM

CROSS REFERENCE TO RELATED APPLICATIONS

This application claims the benefit of Israeli Patent Application No. 174888, filed on Apr. 10, 2006 and the benefit of an additional Israeli Patent Application No. 182382, filed on Apr. 1, 2007.

FIELD OF THE INVENTION

The present invention is in the field of laser directed infrared countermeasures system.

BACKGROUND OF THE INVENTION

The US military has recognized the increasing threat to its tactical aircraft from anti-aircraft infrared (IR) guided missiles. By one estimate more than 500,000 shoulder-fired surface-to-air missiles exist and are available on the worldwide market. The lethality and proliferation of IR surface-to-air missiles (SAMS) was demonstrated during the Desert Storm conflict. Approximately 80% of U.S. fixed-wing aircraft losses in Desert Storm were from ground based Iraqi defensive systems using IR SAMS. Both IR SAMS and IR air-to-air missiles have seekers with improved Counter-Countermeasures (CCM) capabilities that seriously degrade the effectiveness of current expendable decoys.

Usually, when a target platform has been detected, targeted, locked-on, and a missile fired, the in-flight missile needs to be jammed in order to avoid impact. Many IR seeking missiles require lock-on prior to launch and do not have autonomous reacquisition capability. Given an adequate hemispheric missile warning system (such as that in development), it is quite conceivable that the missile can be defeated in flight. Once the missile is detected some form of jamming technique needs to be implemented in order to cut-off the missile's chase after the target platform. One approach is to use an RF weapon (directed from the aircraft under attack, or counter-launched) to defeat the guidance electronics. For optical or IR seekers that are not "in-band" with the RF weapons, a "back-door" means of coupling the RF energy into the attacking missile must be used. Such back-door mechanisms exist; however, they are commonly considered to be unpredictable and statistically diverse, differing by orders of magnitude from missile to missile, even those of the same class, depending on the missile's maintenance history.

Directed infrared countermeasures systems [DIRCM] systems use beams of light, produced by a variety of means such as flash lamps, to exploit knowledge about the design of reticle-scan seekers to defeat their homing mechanisms or guidance systems. In many IR missiles, a reticle within the seeker (or guidance system) causes pulses of light from the target aircraft to "shine" on the missile's infrared detector. The IR detector senses the IR radiation and sends an electric signal to the guidance package, which determines the target location and allows the missile track the target aircraft's location and movement through the sky. By shining a modulated light towards the seeker, an IRCM system provides the infrared detector with extra "false" data, which deceives or "jams" the missile, causing it to miss its intended victim.

There are more than 3,000 IRCM systems deployed worldwide that protect against infrared guided threats. Despite the advantages that DIRCM systems have over flares, these systems have limitations that have prompted a move towards laser-based systems, such as the Navy's TADIRCM system and the Air Force's new LAIRCM system. LAIRCM builds upon the Northrop Grumman's widely-utilized NEMESIS DIRCM platform but replaces the flash lamp source of IR radiation with a laser source.

A laser DIRCM (LDIRCM) based protection suite against MANPADs and other IR guided threats typically includes: a Missile Warning System (MWS) and a Laser Directable Infrared Counter Measure unit, to be described bellow.

The MWS is typically an optical system in the UV or infrared wavelength range. Typically consists of a set of 4-6 imaging detectors (MWS sensor modules), each covering a sector around the platform. The imaging device is typically connected to a signal processing unit that analyzes the images received from the imagers, and decides whether the image includes the signature of a missile. It may also track the missile and provide time-dependent information about its location, may even suggest the type of the missile.

Typically, the MWS consists of a set of staring array detectors that are distributed around the platform and provide 360 coverage around the aircraft, and 10 s of degrees above and bellow the horizon. These staring array detectors usually work in the Solar Blind UV (SBUV) wavelength or the mid-infrared wavelength. There are also Doppler radar systems, which are very effective in terms of low false alarm, but provide accuracy which is typically too low for directing a DIRCM towards the missile.

The laser unit typically includes: a laser unit in Band IV wavelength range (3-5 µm), a laser unit in Band I (1.5-2.5 µm) (necessary mainly for old generation missiles. sometime produced simultaneously by the same laser as the one used for the Band IV), tracker: a thermal imaging system in Band IV, based on a cryogenically cooled detection (typically InSb or MCT detector array), and Beam-steering mechanism, for example a gimbal: a two (or more) axes system that steers the direction of the laser and the tracker towards the missile, either by steering the laser and tracker themselves, or by steering a mirror that steers the beam (the latter is usually referred to as a "mirror gimbal").

The laser is usually an expensive part of the system. Typically laser used is a high power solid state or fiber laser, which emits a pulsed laser beam at wavelength of typically 1 µm, which is then wavelength shifted to the Band IV wavelength region using an Optical Parametric Oscillator (OPO). Such lasers are typically large, expensive and power inefficient. Thus, typically the LDIRCM is based on a single Centralized Unit, where laser radiation is emitted from a single location on the aircraft. In some extreme cases (for example, fighter jets that required protection from all directions, or of aircrafts where obscurations are too high, or large aircraft where the engines are so much apart that they require a separate LDIRCM for each wing), two systems are installed, but their structure is practically similar to the one of the Central Unit.

SUMMARY OF THE INVENTION

There is provided according to some embodiments of the invention a laser directed infrared countermeasures system (hereinafter: "LDIRCM system") mountable on a platform. A LDIRCM system, and in particular the LDIRCM system of the present invention, is intended to provide protection against Infrared (IR) directed weapons. A LDIRCM system, and in particular the LDIRCM system of the present invention, may be part of a protection suite that is intended to provide protection against a variety of threats including IR directed weapons. However, a LDIRCM system according to the present invention may operate as a standalone system which is capable of providing various degrees of protection against a threat directed towards a platform on which the LDIRCM system is mounted, and in particular protection against a threat which uses an IR guidance system to target the protected platform.

According to some embodiments of the invention, a LDIRCM system may include a plurality of sector units, for example three or more sector units. Each sector unit may include at least one laser unit and a laser guidance module. The laser unit may be adapted to generate a laser beam or laser energy that is intended for jamming a guidance system of a threat. The laser unit may be coupled to the laser guidance module. The laser guidance module may be adapted to steer at least a laser beam generated by the laser unit towards a threat.

According to an aspect of invention, each one of the plurality of sector units is configurable to provide, when mounted on the platform, a jamming capability in respect of a threat located within a sector that is substantially less than 180° horizontally. For example, each one of the plurality of sector units is configurable to provide, when mounted on the platform, a jamming capability in respect of a threat located within a sector that is substantially less than 180° horizontally over tens of degrees vertically. The plurality of sector units are mountable on the platform such that each one of the sector units is configurable to provide a jamming capability in respect of a threat located within a different sector relative to the platform. Thus, the threat jamming capability of the LDIRCM system is defined by the aggregate of the different sectors covered by each one of the plurality of sector units.

In accordance with some embodiments of the invention, a plurality of sector units of a LDIRCM system may be mountable on a platform such that each one of the sector units is configurable to provide a jamming capability in respect of a threat located within a different sector relative to the platform, each sector being substantially less than 180° horizontally, thereby giving rise to a collective threat jamming capability covering substantially the full perimeter of the platform.

According to another aspect of the invention, the guidance module of a sector unit may include one or more beam steering elements rotatable about a first and a second axes. The rotation of the beam steering element(s) around the first and the second axis may enable the steering of at least a laser beam generated by the laser unit that is also part of the sector unit towards a threat. The beam steering element(s) may be configured so that a rotation of the beam steering element(s) about a first axis does not cause the orientation of the second axis to change.

According to some embodiments of the invention, a sector unit of the LDIRCM system may be mountable on a platform such that a motion of the beam steering element(s) of a laser guidance module of the sector unit about the first axis does not cause the orientation of the second axis of the beam steering element(s) to change in respect of the platform. According to further embodiments of the invention, the plurality of sector units of the LDIRCM system are also configurable such that when mounted on the platform, each one of the plurality of sector unit provides a jamming capability in respect of a threat located within a different sector relative to the platform. According to still further embodiments of the invention, a sector unit of the LDIRCM system may be configurable such that when mounted on the platform, a motion of the beam steering element(s) of a laser guidance module of the sector units provides a jamming capability in respect of a threat located within a sector relative to the platform that is substantially less than 180° horizontally.

According to further embodiments of the invention, a LDIRCM system mountable on a platform may further include a threat tracking module. The threat tracking module may be mountable on the platform such that while being mounted on the platform the threat tracking module is configured to track a detected threat without moving with respect to the platform, while the threat is within a specific sector relative to the platform. The threat tracking module may be rigidly fixed to the platform, and the threat tracking module may be adapted such that while being rigidly fixed to the platform, the threat tracking module is configured to track a detected threat, while the threat is within a specific sector relative to the platform. It would be appreciated that being rigidly fixed to platform means that the tracking module does not move in respect of the platform during operation. The threat tracking module may be adapted to provide a sector unit with tracking data in respect of a detected threat without being required to move in respect of the platform.

According to further embodiments of the invention, as part of a LDIRCM system a sector unit and a threat tracking module may be mountable on a platform. The sector unit may be mountable on the platform such that it is configured to provide a threat jamming capability in respect of a threat located within a specific sector relative to the platform. The threat tracking module may be mountable on the platform such that it is rigidly fixed to the platform, and such that while being rigidly fixed to the platform (and thus, not being able to move in respect of the platform), the threat tracking module is adapted to track a detected threat within a specific sector relative to the platform, where the tracking module's coverage sector overlaps, at least in part, with the coverage sector of the sector unit.

According to further embodiments of the invention, a threat tracking module may be mountable on a platform such that in addition to being rigidly fixed to the platform, the threat tracking module is rigidly attached to a sector unit (which is also mounted on the platform). The threat tracking module may be rigidly attached to a sector unit whose coverage sector overlaps, at least in part, with the coverage sector of the threat tracking module. The term "rigidly attached" as used here and throughout the specification and the claims relates to an attachment which substantially eliminates misalignment errors which may result from twisting and bending of the body of the platform on which a LDIRCM according to some embodiments of the invention may be mounted. In the context of a LDIRCM system misalignment errors may be considered as being acceptable (or substantially eliminated) if the difference between a location of a threat as seen by the threat tracking module and as represented by tracking data produced by a threat tracking module, and a laser beam directed by a sector unit based upon the tracking data, is smaller than the full width half max of the laser beam far field divergence. A more detailed discussion of the misalignment errors in the context of a LDIRCM system is provided below. According to some embodiments of the invention, a threat tracking module while being rigidly fixed to the platform, may provide a sector unit with tracking data in respect of a detected threat, in a manner to enable the sector unit to direct a laser beam onto the detected threat, and specifically onto a guidance system of the detected threat.

According to further embodiments of the invention, a LDIRCM system may include a plurality of threat tracking modules and each one of the plurality of threat tracking modules, while being rigidly fixed to the platform, may be configured to track a detected threat while the threat is within a different sector relative to the platform. According to some embodiments of the invention, the plurality of threat tracking modules may collectively provide a total threat tracking capability substantially around the full perimeter of the platform. According to still further embodiments of the invention, each one of the plurality of threat tracking modules may also be rigidly attached to a sector unit whose coverage sector overlaps, at least in part, with the coverage sector of the threat tracking module.

According to further embodiments of the invention, a LDIRCM system mountable on a platform may further include a missile warning system (hereinafter: "MWS"). The MWS may include a plurality of MWS sensor modules. A MWS sensor module may be mountable on a platform such that it is rigidly fixed to the platform, and such that while being rigidly fixed to the platform, the MWS sensor module is adapted to detect a signal which include a signature of a threat, while the threat is within a specific sector relative to the platform. According to further embodiments of the invention, a MWS sensor module may be configured, such that while being mounted on a platform, in addition to being configured to detect a threat, the MWS sensor module may also be adapted to track a detected threat while the threat is within a specific sector relative to the platform. Thus, according to some embodiments of the invention, a MWS sensor module may function as a part of a missile or other threat warning or detection system (MWS), but also as a threat tracking module. According to still further embodiments of the invention, a MWS sensor module may be mountable on a platform such that is addition to being rigidly fixed to the platform, the MWS sensor module is rigidly attached to a sector unit (at least one) whose coverage sector (the sector within which the sector unit is configured to direct a laser beam) at least partially overlaps with the coverage sector of the MWS sensor module, and the MWS sensor module may be configured to provide tracking data to the sector unit to which it is rigidly attached in a manner to enable the sector unit to direct a laser beam onto a guidance system of the threat being tracked by the MWS sensor module.

It would be appreciated, that in a LDIRCM system, the use of a MWS sensor module, and specifically of a plurality of MWS sensor modules for tracking a detected threat and for providing tracking data, requires that the tracking data provided by the MWS sensor module(s) is accurate enough to enable the directing of a laser beam (being a LDIRCM system) onto a guidance system of a threat (based on the tracking data). More specifically, it would be appreciated that the use of a MWS sensor module(s) for tracking a threat, requires that the misalignment between a MWS sensor module as a source of the tracking data, and a sector unit as the source of the laser beam that is directed towards a threat based upon the tracking data, is small enough for the sector unit to be able to direct a laser beam onto a guidance system of the threat. Typically, in order for the sector unit to be able to direct a laser beam onto a guidance system of a threat based upon the tracking data received from the MWS sensor module, the difference between a location of the threat, as seen by the MWS sensor module and as represented by the tracking data provided by the MWS sensor module, and the direction of a laser beam directed by a sector unit based upon the tracking data from the MWS sensor module, is smaller than the full width half max of the laser beam far field divergence.

According to another aspect of the invention, a MWS sensor module may also be mountable on the platform such that such that while a threat is detected within a sector relative to the platform that is associated with a sector unit from said plurality of sector units, the MWS sensor module is adapted to provide the sector unit with data in respect of a location and/or direction of the detected threat in a manner to enable the sector unit to direct a laser beam towards a guidance system of the detected threat, and an angular error associated with the data provided by the MWS sensor module to the sector unit is substantially smaller than the far field laser beam divergence.

According to some embodiments of the invention, the angular error that is associated with the data provided by the MWS sensor module to the sector unit may be defined by the error between a direction of the detected threat as provided by the MWS sensor module and a beam centerline of a laser beam generated by a laser unit of the sector unit based on the data from the MWS sensor module.

According to further embodiments of the invention, the plurality of MWS sensor modules are mountable on the platform such that each one of the plurality of MWS sensor modules is configurable to provide threat detection and threat tracking capabilities within a different sector relative to the platform, and the plurality of sector units are mountable on the platform such that each one of the sector units is configurable to provide a jamming capability in respect of a threat located within a different sector relative to the platform. According to still further embodiments of the invention, a MWS sensor module whose detection/tracking coverage sector overlaps at least with a portion of a sector covered by a sector unit may be adapted to provide the sector unit with data in respect of a location and/or direction of the detected threat and the data provided by the MWS sensor module is associated with an angular error that is substantially smaller than the laser beam far field divergence.

According to another aspect of the invention, a MWS sensor module may be mountable on the platform such that while a threat is detected within a sector relative to the platform that is associated with a sector unit from said plurality of sector units, the instantaneous filed of view (hereinafter: "IFOV") of each pixel of the MWS sensor module is smaller than the full width half max (hereinafter: "FWHM") far field divergence angle of a laser beam generated by a laser unit of the sector unit. In a LDIRCM system according to further embodiments of the invention, the IFOV of each pixel of a MWS sensor module may be smaller than the a fraction (for example, half) FWHM far field divergence angle of a laser beam generated by a laser unit of the sector unit.

According to some embodiments of the invention, the IFOV of each pixel of a MWS sensor module is defined by the ratio between the horizontal pitch of substantially each pixel of the MWS sensor module divided by the focal length of the imaging lens of the MWS sensor module.

According to further embodiments of the invention, the plurality of MWS sensor modules are mountable on the platform such that each one of the plurality of MWS sensor modules is configurable to provide threat detection and threat tracking capabilities within a different sector relative to the platform, and the plurality of sector units are mountable on the platform such that each one of the sector units is configurable to provide a jamming capability in respect of a threat located within a different sector relative to the platform. According to still further embodiments of the invention, a MWS sensor module whose detection/tracking coverage sector overlaps at least with a portion of a sector covered by a sector unit may be adapted to provide the sector unit with data in respect of a location and/or direction of the detected threat, whereby while the threat is within the overlapping sector (defined by the overlap between the detection/tracking coverage sector of the MWS sensor module and the sector covered by the sector unit), the IFOV of each pixel provided by the MWS sensor module is smaller than the FWHM far field divergence angle of a laser beam generated by a laser unit of the sector unit.

According to still further embodiments of the invention, the MWS sensor module whose detection/tracking coverage sector overlaps at least with a portion of a sector covered by a sector unit may be adapted to provide the sector unit with data in respect of a location and/or direction of the detected threat so as to enable the sector unit to direct a laser beam towards a guidance system of the detected threat.

According to still a further aspect of the invention, a LDIRCM system may include a MWS sensor module and/or a tracker operable for implementing a first mode and a second mode of operation. According to some embodiments of the invention, during the first mode of operation, the MWS sensor module and/or a tracker sensor module may be adapted for searching at a first frame rate and within a first frame for a signal which includes a signature of a threat directed towards the platform. During the second mode of the operation, the MWS and sensor module/or a tracker sensor module may be adapted to defining a subframe within the first frame around the detected signature of the threat and may be configured to sample the subframe at a second frame rate which is substantially higher than the first frame rate. The location of the subframe within the frame may be updated so that it keeps including the signal from the threat despite the maneuvers of the threat and the platform.

According to an aspect of the invention, there is provided a laser directed infrared countermeasures (hereinafter: "LDIRCM") system mountable on a platform, comprising:
a plurality of sector units each sector unit comprising:
at least one laser unit for jamming a guidance system of a threat; and
a laser guidance module, the laser guidance module being adapted to steer at least the laser beam generated by said laser unit towards a threat,
said plurality of sector units are mountable on the platform such that each one of said plurality of sector units is configurable to provide a jamming capability in respect of a threat located within a different sector relative to the platform, each sector being substantially less than 180° horizontally, whereby a missile jamming capability covering substantially the full perimeter of the platform is thus obtainable.

According to certain embodiments of the invention, each one of said plurality of sector units when mounted on the platform is configurable to provide a jamming capability within a coverage sector that is approximately 90° horizontally and tens of degrees vertically.

According to certain embodiments of the invention, each one of said plurality of sector units when mounted on the platform is configurable to provide a jamming capability within a coverage sector that is approximately 60° horizontally and tens of degrees vertically.

According to certain embodiments of the invention, there is further provided a plurality of threat tracking modules;
and said plurality of threat tracking modules are mountable such that a threat tracking module is rigidly fixed to the platform and is rigidly attached to a sector, and such that while being rigidly fixed to the platform the threat tracking module is adapted to track a threat within a sector which at least partially overlap with a coverage sector of the sector unit to which it is rigidly attached, and is further adapted to provide tracking data to the sector unit to which it is rigidly attached,
and wherein the tracking data received from the threat tracking module that is rigidly fixed to the platform is sufficiently accurate so as to enable the sector unit to direct a laser beam onto a guidance system of the threat.

According to certain embodiments of the invention, there is further provided a missile warning system (hereinafter: "MWS") comprising a plurality of MWS sensor modules, each one of said plurality of MWS sensor modules being adapted to detect a signal which includes a signature of a threat directed towards the platform, and each one of said plurality of MWS sensor modules being further adapted to track a detected threat;
said plurality of MWS sensor modules are mountable on the platform such that a MWS sensor module is rigidly attached to a sector unit and is adapted to track a detected threat within a sector relative to the platform which at least partially overlaps with a coverage sector of the sector unit to which the MWS sensor module is rigidly attached,
and wherein the tracking data received from the MWS sensor module that is rigidly attached to the sector unit is sufficiently accurate so as to enable the sector unit to direct a laser beam onto a guidance system of the threat.

According to certain embodiments of the invention, there is further provided a laser guidance module of a each sector unit includes one or more beam steering elements rotatable about a first and a second axes, thereby enabling said one or more beam steering elements to steer at least the laser beam generated by said laser unit towards a threat, and wherein said plurality of sector units are mountable on the platform such that a motion of said one or more beam steering elements of a laser guidance module of each one of said plurality of sector units about the first axis does not cause the orientation of the second axis of said one or more beam steering elements to change in respect of the platform and vice versa.

According to certain embodiments of the invention, there is further provided a MWSs comprising a of plurality of MWS sensor modules, each one of said plurality of MWS sensor modules being adapted to detect a signal which includes a signature of a threat directed towards the platform, and each one of said plurality of said MWS sensor modules being further adapted to track a detected threat,
said plurality of sector units and said plurality of MWS sensor modules being mountable on the platform, such that each one of said plurality of sector units is configurable to provide a jamming capability in respect of a threat located within a different sector relative to the platform based upon tracking data a MWS sensor module,
and wherein a MWS sensor module is configurable so that while a threat is detected within a sector relative to the platform that is associated with a sector unit from said plurality of sector units, the angular error between a location of a threat as represented by tracking data provided by the MWS sensor module to the sector unit and a beam centerline of a laser beam directed by the sector unit towards the threat based upon the tracking data, is smaller than an the far field laser beam divergence.

According to certain embodiments of the invention, there is further provided a MWS, the MWS comprising a plurality of MWS sensor modules, each one of said plurality of MWS sensor modules being adapted to detect a signal which includes a signature of a threat directed towards the platform, and being further adapted to track a detected threat,
said plurality of sector units and said plurality of MWS sensor modules being mountable on the platform, such that each one of said plurality of sector units is configurable to provide a jamming capability in respect of a threat located within a different sector relative to the platform based upon tracking data a MWS sensor module,
and wherein a MWS sensor module is configurable so that while a threat is detected within a sector relative to the platform that is associated with a sector unit from said plurality of sector units, an Instantaneous Field of View each pixel of the MWS sensor module is smaller than the full width half max far field divergence angle of a laser beam generated and directed towards the threat by the sector unit.

According to certain embodiments of the invention, there is further provided a MWS, the MWS being operable for implementing a first mode of operation for searching at a first frame rate and within a first frame for a signal which includes a signature of a threat directed towards the platform, said MWS being further adapted to implement a second mode operation for tracking a threat detected during said first mode of operation, the second mode of operation including defining a subframe within the first frame around the detected signature of the threat and sampling the subframe at a second frame rate which is substantially higher than the first frame rate.

According to certain embodiments of the invention, wherein each one of said plurality of threat tracking modules is operatively associated with a thermo-electric cooler or is not being actively cooled at all.

According to certain embodiments of the invention, wherein each one of said plurality of threat tracking module includes a SWIR detector having a cutoff wavelength that is between 1.5-3 um.

According to certain embodiments of the invention, wherein each one of said plurality of threat tracking modules is adapted to implement a first mode of operation for searching at a first frame rate and within a first frame for a signal which includes a signature of a threat directed towards the platform, said threat tracking module being further adapted to implement a second mode operation for tracking a threat detected during said first mode of operation, the second mode of operation including defining a subframe within the first frame around the detected signature of the threat and sampling the subframe at a second frame rate which is substantially higher than the first frame rate.

According to certain embodiments of the invention, wherein each one of said plurality of MWS sensor modules is operatively associated with a thermo-electric cooler or is not being actively cooled at all.

According to certain embodiments of the invention, wherein each one of said plurality of MWS sensor modules includes a SWIR detector having a cutoff wavelength that is between 1.5-3 um.

According to certain embodiments of the invention, there is further provided a MWS, the MWS including at least a radar threat detection unit.

According to certain embodiments of the invention, wherein the beam steering elements include two mirror for reflecting a laser beam incident on the surface thereof, and each mirror being coupled to a rotation motor.

According to certain embodiments of the invention, wherein the laser guidance module includes at least two linear motor and a mirror for enabling the steering of a laser beam towards a threat.

According to certain embodiments of the invention, wherein the laser unit includes a semiconductor laser that is configurable to provide a laser beam at a wavelength between 3-5 um.

According to certain embodiments of the invention, wherein the laser unit includes a laser selected from a group consisting of: a quantum cascade laser; a interband cascade laser; an externally pumped semiconductor laser that is configurable to provide a laser beam at a wavelength between 3-5 um.

According to an aspect of the invention, there is provided a LDIRCM system mountable on a platform, comprising:
at least one laser unit for jamming a guidance system of a threat;
a plurality of sector units each sector unit comprising a laser guidance module, the laser guidance module being adapted to steer at least the laser beam generated by said laser unit towards a threat,
a plurality of threat tracking modules;
said plurality of sector units are mountable on the platform such that each one of said plurality of sector units is configurable to provide a jamming capability in respect of a threat located within a different sector relative to the platform,
and said plurality of threat tracking modules are mountable such that a threat tracking module is rigidly fixed to the platform and is rigidly attached to a sector, and such that while being rigidly fixed to the platform the threat tracking module is adapted to track a threat within a sector which at least partially overlap with a coverage sector of the sector unit to which it is rigidly attached, and is further adapted to provide tracking data to the sector unit to which it is rigidly attached,
and wherein the tracking data received from the threat tracking module that is rigidly fixed to the platform is sufficiently accurate so as to enable the sector unit to direct a laser beam onto a guidance system of the threat.

According to certain embodiments of the invention, wherein each one of said plurality of threat tracking modules is operatively associated with a thermo-electric cooler or is not being actively cooled at all.

According to certain embodiments of the invention, wherein the tracker includes a SWIR detector having a cutoff wavelength that is between 1.5-3 um.

According to certain embodiments of the invention, wherein each one of said plurality of threat tracking modules is adapted to implement a first mode of operation for searching at a first frame rate and within a first frame for a signal which includes a signature of a threat directed towards the platform, said threat tracking module being further adapted to implement a second mode operation for tracking a threat detected during said first mode of operation, the second mode of operation including defining a subframe within the first frame around the detected signature of the threat and sampling the subframe at a second frame rate which is substantially higher than the first frame rate.

According to certain embodiments of the invention, there is further provided a MWS, the MWS including at least a radar threat detection unit.

According to an aspect of the invention, there is provided a LDIRCM system mountable on a platform, comprising:
a plurality of sector units, each of said sector units comprising:
at least one laser unit for jamming a missile's guidance system; and
a laser guidance module, the laser guidance module being adapted to steer at least the laser beam generated by said laser unit towards a threat;
a missile warning system (hereinafter: "MWS") comprising a plurality of MWS sensor modules, each one of said plurality of MWS sensor modules being adapted to detect a signal which includes a signature of a threat directed towards the platform, and each one of said plurality of MWS sensor modules being further adapted to track a detected threat;
said plurality of sector units are mountable on the platform such that each one of said plurality of sector units is configurable to provide a jamming capability in respect of a threat located within a different sector relative to the platform,
said plurality of MWS sensor modules are mountable on the platform such that a MWS sensor module is rigidly attached to a sector unit and is adapted to track a detected threat within a sector relative to the platform which at least partially overlaps with a coverage sector of the sector unit to which the MWS sensor module is rigidly attached,
and wherein the tracking data received from the MWS sensor module that is rigidly attached to the sector unit is sufficiently accurate so as to enable the sector unit to direct a laser beam onto a guidance system of the threat.

According to certain embodiments of the invention, wherein each one of said plurality of MWS sensor modules is operatively associated with a thermo-electric cooler or is not being actively cooled at all.

According to certain embodiments of the invention, wherein each one of said plurality of MWS sensor modules includes a SWIR detector having a cutoff wavelength that is between 1.5-3 um.

According to an aspect of the invention, there is provided a LDIRCM system mountable on a platform, comprising:
a plurality of sector units, each one of said sector units comprising:
at least one laser unit for jamming a missile's guidance system; and
a laser guidance module, the laser guidance module being adapted to steer at least the laser beam generated by said laser unit towards a threat;
the laser guidance module including one or more beam steering elements rotatable about a first and a second axes, thereby enabling said one or more beam steering elements to steer at least the laser beam generated by said laser unit towards a threat,
said plurality of sector units are mountable on the platform such that a motion of said one or more beam steering elements of a laser guidance module of each one of said plurality of sector units about the first axis does not cause the orientation of the second axis of said one or more beam steering elements to change in respect of the platform and vice versa.

According to certain embodiments of the invention, wherein the beam steering elements include two mirror for reflecting a laser beam incident on the surface thereof, and each mirror being coupled to a rotation motor.

According to an aspect of the invention, there is provided a LDIRCM system mountable on a platform, comprising:
a plurality of sector units mountable on a platform, each one of said sector units comprising:
at least one laser unit for jamming a missile's guidance system; and
a laser guidance module, the laser guidance module being adapted to steer at least the laser beam generated by said laser unit towards a threat;
a MWSs comprising a of plurality of MWS sensor modules, each one of said plurality of MWS sensor modules being adapted to detect a signal which includes a signature of a threat directed towards the platform, and each one of said plurality of said MWS sensor modules being further adapted to track a detected threat,
said plurality of sector units and said plurality of MWS sensor modules being mountable on the platform, such that each one of said plurality of sector units is configurable to provide a jamming capability in respect of a threat located within a different sector relative to the platform based upon tracking data a MWS sensor module,
and wherein a MWS sensor module is configurable so that while a threat is detected within a sector relative to the platform that is associated with a sector unit from said plurality of sector units, the angular error between a location of a threat as represented by tracking data provided by the MWS sensor module to the sector unit and a beam centerline of a laser beam directed by the sector unit towards the threat based upon the tracking data, is smaller than an the far field laser beam divergence.

According to certain embodiments of the invention, wherein each one of said plurality of MWS sensor modules is operatively associated with a thermo-electric cooler or is not being actively cooled at all.

According to certain embodiments of the invention, wherein each one of said plurality of MWS sensor modules includes a SWIR detector having a cutoff wavelength that is between 1.5-3 um.

According to an aspect of the invention, there is provided a laser LDIRCM system mountable on a platform, comprising:
a plurality of sector units mountable on a platform, each one of said sector units comprising:
at least one laser unit for jamming a missile's guidance system; and
a laser guidance module, the laser guidance module being adapted to steer at least the laser beam generated by said laser unit towards a threat;
a MWS comprising a plurality of MWS sensor modules, each one of said plurality of MWS sensor modules being adapted to detect a signal which includes a signature of a threat directed towards the platform, and being further adapted to track a detected threat,
said plurality of sector units and said plurality of MWS sensor modules being mountable on the platform, such that each one of said plurality of sector units is configurable to provide a jamming capability in respect of a threat located within a different sector relative to the platform based upon tracking data a MWS sensor module,
and wherein a MWS sensor module is configurable so that while a threat is detected within a sector relative to the platform that is associated with a sector unit from said plurality of sector units, an Instantaneous Field of View each pixel of the MWS sensor module is smaller than the full width half max far field divergence angle of a laser beam generated and directed towards the threat by the sector unit.

According to certain embodiments of the invention, wherein each one of said plurality of MWS sensor modules is operatively associated with a thermo-electric cooler or is not being actively cooled at all.

According to certain embodiments of the invention, wherein each one of said plurality of MWS sensor modules includes a SWIR detector having a cutoff wavelength that is between 1.5-3 um.

According to an aspect of the invention, there is provided a LDIRCM system mountable on a platform, comprising:
one or more sector units, each of said one or more sector units comprising:
at least one laser unit for jamming a guidance system of a threat; and
a laser guidance module, the laser guidance module being adapted to steer at least a laser beam generated by said laser unit towards a threat;
a MWS operable for implementing a first mode of operation for searching at a first frame rate and within a first frame for a signal which includes a signature of a threat directed towards the platform, said MWS being further adapted to implement a second mode operation for tracking a threat detected during said first mode of operation, the second mode of operation including defining a subframe within the first frame around the detected signature of the threat and sampling the subframe at a second frame rate which is substantially higher than the first frame rate.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 6A is a graphical illustration of an instantaneous filed of view of one pixel in an array of sensors which may be part of a MWS sensor module or as part of an array of sensor which is part of a designated threat tracking sensor, according to some embodiments of the invention;

FIG. 6B is a block diagram illustration of a divergence of a laser beam which may be generated by a sector unit that is part of a LDIRCM system according to some embodiments of the invention; and FIG. 6C a graph illustrating the divergence angle of the laser beam shown in FIG. 6B.

Figure 1:
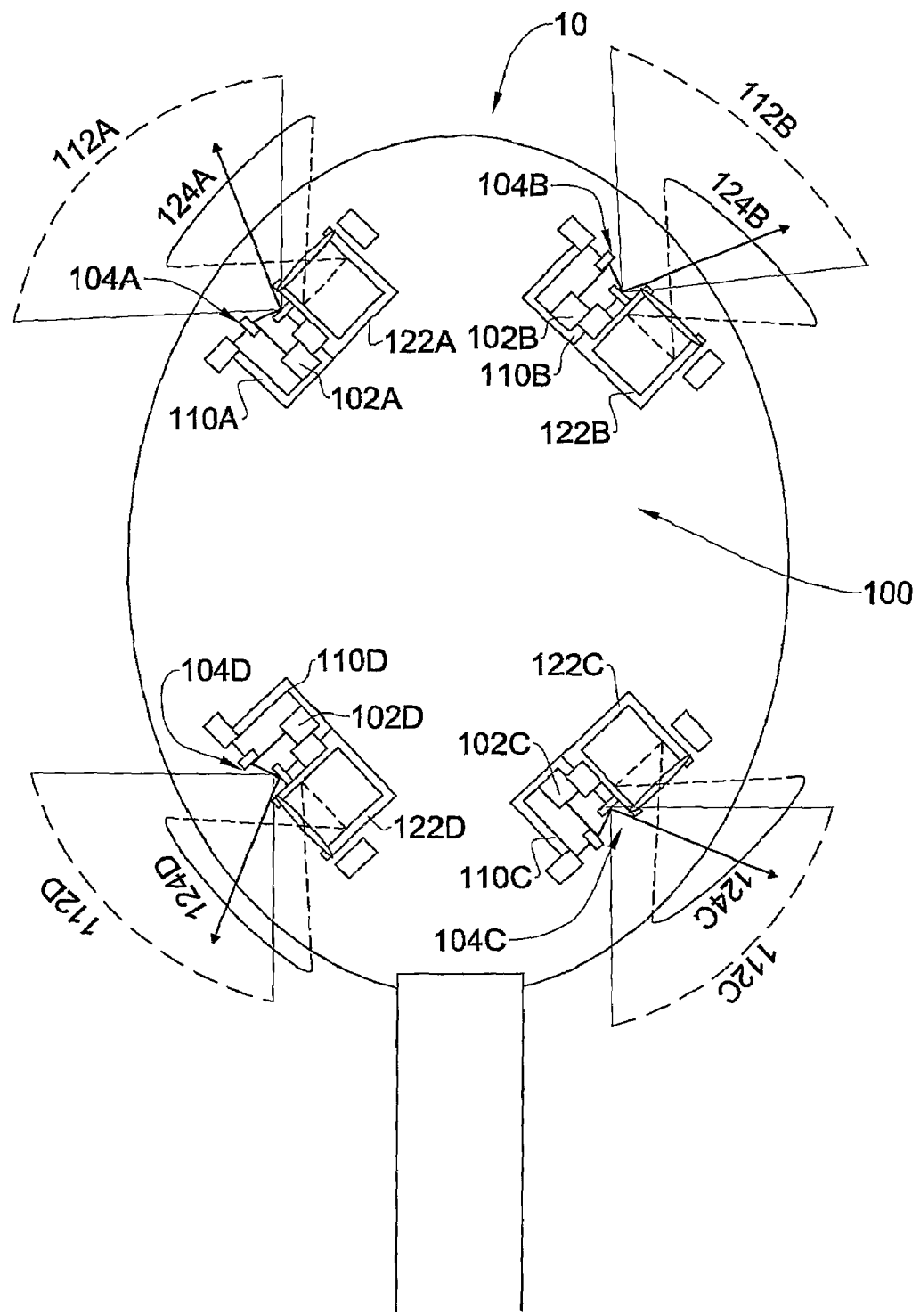
FIG. 1 is an isometric view of a LDIRCM system according to some embodiments of the invention, mounted on a platform.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is now made to FIG. 1, which is an isometric graphic illustration of a LDIRCM system according to some embodiments of the invention mounted on a platform. In FIG. 1 and according to some embodiments of the invention, there is shown a LDIRCM system 100 which includes a plurality of sector units 110A-110D mounted on a platform 10. According to some embodiments of the invention, each sector unit may include at least one laser unit 102A-102D and a laser guidance module 104A-104D. The laser unit of each sector unit may be adapted to generate a laser beam or laser energy that is intended for jamming a guidance system of a threat. The laser unit may be coupled to the laser guidance module. The laser guidance module of each sector unit may be adapted to steer at least a laser beam generated by the laser unit towards a threat. The components of a sector unit shall be discussed in greater detail below, in particular with reference to FIG. 2.

According to an aspect of invention, each one of the plurality of sector units 110A-110D is configurable to provide, when mounted on a platform 10, a jamming capability in respect of a threat located within a sector 112A-112D, respectively, that is substantially less than 180° horizontally. The coverage sector of each one of the sector units 110A-110D may be in the order of tens of degrees vertically, for example. In accordance with one example, in FIG. 1, four sector units 110A-110D are included in a LDIRCM system 100 that is mounted on the platform 10. Each one of the sector units mounted on the platform 10 is configured to provide a laser jamming capability in respect of threat located within a sector of 100°×90° relative to the platform 10. It would be appreciated that the LDIRCM illustrated by FIG. 1, is only one example of an implementation of a LDIRCM system according to some embodiments of the invention. Furthermore, many variations to the LDIRCM system shown in FIG. 1 may be within the scope of the invention including, but not limited to, the number of sector unit which are mounted on a platform as part of a LDIRCM system, and the size of the coverage sector of each one of the plurality of sector units which are part of a LDIRCM system.

Further according to some embodiments of the invention, the plurality of sector units 110A-110D may be mounted on the platform 10 such that each one of the sector units is configured to provide a jamming capability in respect of a threat located within a different sector relative to the platform 10, in FIG. 1 each one of the sectors 112A-112D is covered by a different sector unit. It would be appreciated that even if some overlap between two or more coverage sectors of different sector units exists, the coverage sectors may be considered as being different sectors. It would be further appreciated that a certain degree of overlap between different coverage sectors of different sector units may be desirable. For example, having some degree of overlap between the coverage sectors may be used to compensate for installation inaccuracies. Furthermore, according to certain embodiments of the invention, two or more sector units may be mounted on the platform, for example, such that each of the two (or more) sector units provides backup coverage to at least a portion of the coverage sector associated with the other sector unit(s) (e.g. in case of failure) and/or in accordance with another example, the sector units may be used simultaneously when at threat is within the overlap sector may provide to provide increased protection within the common coverage sub-sectors.

A LDIRCM system 100 according to some embodiments of the invention may enable to mount on a platform 10 a plurality of sector units 110A-110D, such that each one of the sector units provides a different coverage sector 112A-112D around the platform 10, giving rise to a threat jamming capability that is defined by the aggregate of the different coverage sectors. Thus, in accordance with some embodiments of the invention, a plurality of sector units 110A-110D of a LDIRCM system 100 may be mountable on a platform 10 such that each one of the sector units is configurable to provide a jamming capability in respect of a threat located within a different sector relative to the platform 10, each sector being substantially less than 180° horizontally, giving rise to a collective threat jamming capability covering substantially the full perimeter 114 of the platform 10 (typically, 360°).

According to still further embodiments of the invention, the plurality of sector units 110A-110D may be mountable on the platform 10 such that the plurality of sector units are distributed around the platform. The plurality of sector units 110A-110D may be distributed around the platform 10 such that each one of the plurality of sector units provides a different coverage sector 112A-112D around the platform 10. As mentioned above each sector may be substantially less than 180° horizontally, and the total coverage provided by the plurality of sector units may provide threat jamming capability around the full perimeter 114 of the platform.

Having described in brief one aspect of the invention and some embodiments which are related to the first aspect of the invention, there is now provided a description of a further aspect of the present invention. A LDIRCM 100 according to some embodiments of the invention may further include a plurality of tracking modules 122A-122D. Each one of the threat tracking modules 122A-122D may be mountable on the platform 10 such that while being mounted on the platform the threat tracking module is configured to track a detected threat without moving with respect to the platform 10, while the threat is within a specific sector 124A-124D relative to the platform 10. Each one of the threat tracking modules 122A-122D may be rigidly fixed to the platform, and each one of the threat tracking modules may be adapted such that while being rigidly fixed to the platform 10, the threat tracking module is configured to track a detected threat while the threat is within a specific sector 124A-124D relative to the platform. Each one of the threat tracking modules 122A-122D may be adapted to provide a sector unit with tracking data in respect of a detected threat, without being required to move in respect of the platform 10.

According to further embodiments of the invention, each one of the threat tracking modules 122A-122D may be mountable on the platform 10 such that it is rigidly fixed to the platform 10, and such that while being rigidly fixed to the platform 10 (and thus, not being able to move in respect of the platform), the threat tracking module is adapted to track a detected threat within a specific sector relative to the platform 10. The tracking module's coverage sector may overlap, at least in part, with the coverage sector of one or more a sectors unit that is (are) also mounted on the platform. The threat tracking module may be adapted to provide the tracking data to the sector unit whose coverage sector includes the location of the threat.

In accordance with one embodiment of the invention, each one of a plurality of threat tracking modules 122A-122D may be mountable on the platform 10 such that it is adapted to detect a threat within a sector which substantially overlaps with a coverage sector of one of a plurality of sector units 110A-1101D (which may be mounted on the platform 10 together with the threat tracking modules 122A-122D). For example, in FIG. 1, each one of the threat tracking modules 122A-122D that are mounted on the platform 10 has a coverage sector 124A-124D, respectively, which almost completely overlaps (and thus, at least partially overlaps) with the coverage sector 112A-112D, respectively, of sector units 110A-110D, respectively. Each one of the plurality of threat tracking modules 122A-122D may be configured to provide each corresponding sector unit 122A-122D with tracking data, as will be described in further detail below.

According to further embodiments of the invention, each one of the threat tracking modules 122A-122D may be mountable on a platform such that in addition to being rigidly fixed to the platform 10, the threat tracking module is rigidly attached to a sector unit (which is also mounted on the platform). The threat tracking module may be rigidly attached to a sector unit whose coverage sector overlaps, at least in part, with the coverage sector of the threat tracking module. In FIG. 1, as mentioned above, there is a substantially full overlap between the coverage sector of each one of the threat tracking modules 122A-122D and the coverage sector of each one of the corresponding sector units 110A-110D. Accordingly, in FIG. 1, and in accordance with some embodiments of the invention, each one of the threat tracking modules 122A-1221D may be rigidly attached to a respective one of the plurality of sector units 110A-110D. Each one of the threat tracking modules 122A-122D may be rigidly attached to a respective one of the plurality of sector units 110A-110D in a manner to substantially eliminate misalignment errors between the threat tracking module and the respective sector unit. The terms "rigidly attached" and "misalignment errors" were discussed in further detail above.

According to some embodiments of the invention, a LDIRCM system 100 mountable on a platform 10 may further include a missile warning system 120 (hereinafter: "MWS"). The MWS 120 may include a plurality of MWS sensor modules. A MWS sensor module may be mountable on a platform 10 such that it is rigidly fixed to the platform 10, and such that while being rigidly fixed to the platform 10, the MWS sensor module is adapted to detect a signal which include a signature of a threat, while the threat is within a specific sector relative to the platform 10. According to further embodiments of the invention, a MWS sensor module may be configured, such that while being mounted on a platform, in addition to being configured to detect a threat, the MWS sensor module may also be adapted to track a detected threat while the threat is within a specific sector relative to the platform. Thus, according to some embodiments of the invention, a MWS sensor module may function as a part of a missile or other threat warning or detection system (MWS) 120, but also as a threat tracking module.

For example, in FIG. 1, and in accordance with some embodiments of the invention, each one of the threat tracking modules 122A-122B is actually a MWS sensor module (and vice vera). Thus, according to some embodiments of the invention, each one of the plurality of MWS sensor modules may be adapted to track a detected threat while the threat is within a specific sector relative to the platform (in addition to being able to detected the threat). For convenience purposes, in the following description of some embodiments of the invention, a threat tracking module is described as being implemented as part of a MWS sensor module which is capable to provide tracking data in respect of a detected threat (in addition to being adapted to detect the threat), similarly a plurality of threat tracking modules are described as being implemented as part of a corresponding plurality of MWS sensor modules. It would be appreciated however, that further embodiments of the invention are not limited to this specific implementation and that a threat tracking module may be implemented in other ways, including via a distinct component which operate as a stand alone unit (which provide tracking data to a sector unit).

According to still further embodiments of the invention, a MWS sensor module may be mountable on a platform such that in addition to being rigidly fixed to the platform, the MWS sensor module is rigidly attached to a sector unit (at least one) whose coverage sector (the sector within which the sector unit is configured to direct a laser beam) at least partially overlaps with the coverage sector of the MWS sensor module, and the MWS sensor module may be configured to provide tracking data to the sector unit to which it is rigidly attached in a manner to enable the sector unit to direct a laser beam onto a guidance system of the threat being tracked by the MWS sensor module.

For example, in FIG. 1 and in accordance with some embodiments of the invention, a MWS system 120 may include four MWS sensor modules 122A-122D. Each one of the plurality of MWS sensor modules 122A-122D may be mounted on the platform 10, such that it is configured to detect a signal which includes a signature of a threat that is directed towards the platform 10. Each one of the plurality of MWS sensor modules 122A-122D may be mounted on the platform 10, such that the MWS sensor module is configured to detect a threat while the threat is within a certain sector relative to the platform 10. Each one of the plurality of MWS sensor modules may be configured to operate within a different coverage sector (sectors 124A-124D), although some overlap between different sectors (124A-124D) may exist. More details with respect to a MWS and with respect to a MWS sensor module and the components thereof shall be provided below.

As mentioned above, according to some embodiments of the invention, each one of the plurality of MWS sensor modules 122A-122D may have a dual functionality and may be used as a common MWS sensor module, for detecting a signal which includes a signature of a threat, but also as a threat tracking module that is capable of tracking a detected threat and providing the tracking data to a sector unit in a manner to enable the sector unit to direct a laser beam onto a guidance system of the threat. Each one of the plurality of MWS sensor modules may be rigidly fixed to the platform 10 and may provide both the detection function and the tracking functions while being rigidly fixed to the platform, and thus not moving in respect of the platform during operation. Each one of the plurality of MWS sensor modules 122A-122D that are rigidly fixed to the platform may be adapted to provide threat detection and threat tracking capabilities within a specific sector relative to the platform 10. It would be appreciated that typically the detection coverage sector of a MWS sensor module would be substantially identical to the tracking coverage sector of the MWS sensor module. However, the present invention is not limited in this respect and some different may exist between the detection and tracking coverage sector offered by a MWS sensor module.

As mentioned above, according to some embodiments of the invention, a plurality of sector units may also be mountable on a platform, and each sector unit may be configurable to provide laser jamming capabilities in respect of a threat located within a different sector relative to the platform 10. According to further embodiments of the invention, a MWS sensor module from said plurality of MWS sensor modules 122A-122D may be mounted on the platform 10 such it is rigidly attached to one or more of the sector units. For example in FIG. 1, MWS sensor module 122A is rigidly attached to sector unit 110A, MWS sensor module 122B is rigidly attached to sector unit 110B, MWS sensor module 122C is rigidly attached to sector unit 110C and MWS sensor module 122D is rigidly attached to sector unit 110D.

As mentioned above, each one of the plurality of MWS sensor modules 122A-122D, while being rigidly fixed to the platform 10, may be adapted to provide threat detection and threat tracking capabilities within a specific sector 124A-124D, respectively, relative to the platform 10. According to still further embodiments of the invention, a MWS sensor module may be rigidly fixed to the platform such that it is configurable to provide threat tracking capabilities within a sector relative to the platform which at least partially overlaps with a jamming sector covered by a sector unit to which the MWS sensor module is rigidly attached.

Before going into a more detailed description of the components of a LDIRCM system according to embodiments of the invention, there is now provided a description of some of the advantages which may be provided by various embodiments of the distributed LDIRCM system and also a description of some of the innovative concepts which make possible the benefit of these and/or other advantage.

A LDIRCM 100 system which includes a plurality of sector units 110A-11D, each including one or more laser units 102A-102D, respectively, capable of jamming a guidance system of a threat, may provide some advantages over typical LDIRCM systems which include only one or two laser units (a laser unit in the context of a typical LDIRCM system corresponds to a sector unit in a distributed LDIRCM system according to the present invention). The advantages provided by a LDIRCM system which includes a plurality of sector units may include, but are not limited to following:

A First advantage of a LDIRCM system which includes a plurality of sector units is associated with the small sector size which needs to be covered by each sector unit (while maintaining full perimeter coverage) and the possibility of using a tracker that is not required to move together with the laser unit (or that the FOV of the tracker moves together with the laser beam generated by the laser unit).

Usually, in a typical LDIRCM system the coverage sector of a laser unit is relatively large, for example about 180° or more in case two laser units (which may use a single central laser and a switch between the two laser units) are used or about 360° when a single laser unit is used. Typically, a tracking sensor is provided which needs to be able to track a detected threat throughout the entire coverage sector of the laser unit with which it is associated. In order to provide tracking coverage within the entire coverage sector of the laser unit, the tracking sensor is typically mounted or coupled to a guidance module of the laser unit, such that while the tracking sensor has a relatively limited filed of view compared to the coverage sector of the laser unit, it can be steered towards the approximate location of the threat and may "fine-tune" the tracking of the detected threat, so that the laser unit is able to direct a laser beam onto a guidance system of the threat. In fact, the role of the tracking sensor is typically to compensate for the misalignment between the sensor which detected the threat (and provided the initial data in respect of the location of the threat), and the laser unit.

It would be appreciated that the mounting of the tracking sensor on the gimbals places an additional load on the gimbals and increases the size and weight of the laser unit. The additional load can affect the performance of the gimbals (for example, increase response time, increase recycling time from one threat to the next), increase the wearing of the gimbals and affect the reliability of the gimbals. Since a typical tracking sensor usually requires a cooling unit, which is typically required to be mounted on the gimbals together with the tracking sensor, the load on the gimbals may be even higher and the effects of the load even worse. Moreover, the aperture of a band IV tracker may be typically significantly larger than the aperture of the laser, and the FOV of the tracker may be typically wider than the laser beam divergence. These two attributes of the band IV tracker may give to a requirement that a mirror gimbal or other beam steering mechanism that is responsible for steering the beam of the tracker be significantly larger and more complex than a beam steering mechanism for only the laser beam. It would be appreciated that the reference to gimbals is made by way or example, and that other types of beam steering elements may also be negatively affected by the mounted of a tracking sensor and associated components thereon.

The smaller coverage sector which needs to be provided by a sector unit in a LDIRCM system according to some embodiments of the invention, enable a design which does not require the sensor to be mounted or operatively coupled to the beam steering elements. Rather according to some embodiments of the invention, a threat tracking sensor may be provided which is rigidly fixed to the platform. According to some embodiments of the invention, a threat tracking sensor (one or more), while being rigidly fixed to the platform, may be able to provide threat tracking capabilities throughout the coverage sector of a sector unit. The threat tracking sensor (one or more), while being rigidly fixed to the platform, may be adapted to provide a sector unit with tracking data that is accurate enough to enable the sector unit to direct a laser beam onto the guidance system of the threat being tracked. In a specific embodiment of the invention, each sector unit in a distributed LDIRCM system is associated with one threat tracking sensor which provides tracking data in respect of the entire coverage sector of the respective sector unit with enough accuracy so as to enable the sector unit to direct a laser beam onto a guidance system of the threat. The accuracy of the threat tracking sensor shall be discussed in greater details below.

Additionally, the possibility of using a threat tracking sensor (or more than one if necessary) which covers an entire coverage sector of a sector unit, without having to move the threat tracking sensor enables even further innovative implementations of a LDIRCM system according to some embodiments of the invention. The further innovative implementations made possible through the use of an "off gimbal" threat tracking sensor (or a tracking sensor that is rigidly fixed to the platform, rather than beam mounted or operatively coupled to a beam steering element), and some further advantages which may be available from these innovative implementation are discussed below.

Additional advantages of a LDIRCM system which includes a plurality of sector units are associated with the more flexible positioning of the laser units (which are part of the sector units in a distributed LDIRCM system according to embodiments of the present invention) on the platform. Instead of having to choose one or two locations on the platform where a laser unit is (are) to be mounted, a wider selection is made available through the use of a plurality of sector units. It would be appreciated that there is a greater possibility of being able to avoid obscuration or to minimize it with a distributed system which includes a plurality of sector units which collectively provide coverage substantially around the full perimeter of the platform, instead of having to find a single location, or two locations, on the platform that can provide full perimeter coverage around the platform that is not interfered by obstructions.

For example, in military helicopters, a laser system of a typical LDIRCM system is usually placed behind the rotor. In this case, the LDIRCM system does not cover the front sector of the helicopter, which is obscured by the rotor. Some angles at the back of the helicopter may also be obscured by the tail. The bottom part of the helicopter may also lack protection in this scenario and the helicopter may be vulnerable to threats fired at steep angles relative to the helicopter. Even if the performance penalty is disregarded and a LDIRCM system with two laser systems is mounted on the helicopter, substantial sectors around the helicopter will remain unprotected due to obstruction.

The more flexible positioning of the sector units that is made possible through implementing some embodiments of the distributed LDIRCM system of the present invention can help to overcome, at least to some degree, the problem of "blind spots" due to obstructions.

The more flexible positioning of the sector units that is made possible through implementing some embodiments of the present invention may provide further advantages, as will be explained below.

As mentioned above, a typical LDIRCM system includes a MWS system which is intended for detecting a signal which includes a signature of a detected threat. The MWS system typically includes a plurality of MWS sensor modules which are distributed around a platform. Typically, each MWS sensor module is configure to "stare" at a specific sector relative to the platform and to identify suspicious signals, identify threats, and provide a laser system with initial data in respect of the location of the detected threat. The data is received by a laser unit and is used to direct a threat tracking sensor to the approximate location of the threat. The threat tracking sensor acquires the threat within its FOV, and "fine-tunes" the aiming of the laser beam which is then activated. The threat tracking sensor is responsible for tracking the detected threat until it is determined that the threat has been successfully jammed, usually based on data from the threat tracking sensor.

As was already implied in the description of the process of detecting and tracking a threat in a typical LDIRCM system which was described above, although a MWS sensor module in a typical LDIRCM system is capable of detecting a threat and of providing data in respect of the threat's location, the data from the MWS sensor module is not accurate enough to enable the laser unit to direct a laser beam onto the guidance system of the detected threat. The inaccuracies between a MWS sensor module (or any other sensor which provides the initial location of a detected threat) and a laser unit in a typical LDIRCM system, are contributable, at least in part, to the fact that while the MWS sensor modules need to be distributed around the platform in order to provide full perimeter detection coverage, the laser system is mounted at a central location on the platform, or two locations in case two laser systems are used (which may use a single central laser and a switch between the two laser units). As is well known, even a seemingly rigid platform can experience some level of bending and twisting under substantial forces exerted thereon. Since in a LDIRCM system relatively focused laser energy needs to be directed onto a guidance system of a moving threat, a significant physical detachment between the MWS providing the data in respect of the threat and the laser unit which needs to direct a laser beam onto the threat can easily cause misalignment and unacceptable inaccuracies. In a typical LDIRCM system, an additional tracking sensor is usually required in order cover the misalignment between a MWS sensor module which detects a threat and a laser system which needs to be able to direct a laser beam onto the guidance system of the detected threat.

In accordance with an aspect of the invention, a LDIRCM system may be provided which includes a plurality of sector units. A sector unit from the plurality of sector unit in a distributed LDIRCM system may be mountable on the platform, such that a MWS sensor module that is also mounted on the platform, and whose coverage sector at least partially overlaps with a coverage sector of the sector unit, is configured to detect a signal which includes a signature of a threat and is further configured to track the detected threat and provide tracking data to the sector unit that is accurate enough to enable the sector unit to direct a laser beam onto the guidance system of the detected threat, at least while the detected threat is within the overlapping coverage sector. The typically accuracy which is required for enabling the directing of a laser beam on the a guidance system of a threat was explained and discussed above.

According to some embodiments of the invention, a MWS sensor module may be used as a threat tracking sensor to provide a sector unit with tracking data that is sufficiently accurate to enable a sector unit to direct a laser beam onto the guidance system of a detected threat, thus eliminating the need for an additional sensor for threat tracking purposes. However, further embodiments of the invention may not be limited in this respect. For example, as part of a LDIRCM system according to further embodiments of the invention, although a MWS sensor module may be capable of tracking a detected threat so as to provide a sector unit with tracking data that is sufficiently accurate to enable a sector unit to direct a laser beam onto the guidance system of a detected threat, an additional threat tracking sensor may be provided, for example, for each sector unit. The additional threat tracking sensor may be used in combination with the MWS sensor module to track a detected threat, or it may be used exclusively to track a detected threat, or in accordance with further embodiments of the invention, each one of the threat tracking sensor and the MWS sensor module may be independently used to track a detected threat. As mentioned above, in accordance with some embodiments of the invention, the threat tracking sensor may be rigidly fixed to the platform and may be configured to track a detected threat without moving in respect of the platform, It would be appreciated, that a typical MWS sensor module is also rigidly fixed to the platform. Thus, according to some embodiments of the invention, a MWS module may be adapted to track a detected threat (in addition to being able to detect the threat), without having to move in respect of the platform, and with sufficient accuracy so as to enable a sector unit to direct a laser beam onto the guidance system of the detect threat which is being tracked.

According to further embodiments of the invention, a MWS sensor module whose detection/tracking coverage sector overlaps with at least a portion of a sector covered by a sector unit may also be rigidly attached to the sector unit. The term "rigidly attached" as used herein includes any form of attachment by which a MWS sensor module may be attached to a sector such that it does not move (during operation) in respect of the sector unit, for example, such that it does not move in respect of a housing or a chassis of the sector unit. Those of ordinary skill in the art may be aware of various ways by which a MWS sensor module may be rigidly attached to a sector unit. According to further embodiments of the invention, there may be provided a distributed LDIRCM system which includes a plurality of sector units. Each one of the plurality of sector units may be mountable on the platform, such that a MWS sensor module that is also mounted on the platform, and whose coverage sector at least partially overlaps with a coverage sector of the sector unit, is configured to detect a signal which includes a signature of a threat and is further configured to track the detected threat and to provide tracking data to the sector unit that is accurate enough to enable the sector unit to direct a laser beam onto the guidance system of the detected threat, at least while the detected threat is within the overlapping coverage sector. According to yet further embodiments of the invention, a coverage sector of a sector unit and a respective MWS sensor module may be substantially overlapping, and the MWS sensor module may provide threat detection and threat tracking coverage substantially throughout the coverage sector of the respective sector unit.

It should be appreciated, that the possibility of using a MWS sensor module to provide both detection data and tracking data which is accurate enough to enable a sector unit to a laser beam onto a guidance module of a threat, is contributable, at least in part to the use of a plurality of sector units in a LDIRCM system and the sector unit installation flexibility. For example, reference is made back to the LDIRCM system 100 illustrated by FIG. 1., in which each one of the sector units may be mounted on the platform 10 such that a MWS sensor module is rigidly attached to one (or more) of the sector units. For example, MWS sensor module 122A may be rigidly attached to sector unit 110A by the use of a common frame. Thus, it would be appreciated that the twisting and bending of a portion of the body of the platform 10 in-between the sector unit and the MWS sensor module that is rigidly attached to the sector unit is made negligible, and so is the misalignment between the MWS sensor module and the sector unit. This enables the use of tracking data from the MWS for pointing a laser beam in an accurate manner on the threat.

It should be further appreciated that by providing a LDIRCM system in accordance with some embodiments of the invention, which includes a MWS sensor module(s) that is configurable to provide tracking data to a sector unit (in addition to detecting a threat) with sufficient accuracy so as to enable the sector unit to direct a laser beam onto a guidance system of a threat, the need for a separate tracking sensor may be eliminated. Furthermore, by eliminating the need for a further tracking sensor and using instead a MWS sensor module that is rigidly attached to a sector unit, there is also eliminated the need to move the tracking sensor (or the field of view of the sensor) together with the laser unit (or together with components which direct the laser energy).

It would be further appreciated that it is necessary to reduce the weight and/or size and/or the cost of each sector unit in order to provide a distributed LDIRCM system which includes a plurality of sector units (for example, three sector units), without substantially increasing the total weight, size and/or cost of the system compared to a typical LDIRCM system. In this respect, it would be appreciated that by eliminating the need for a dedicated tracking sensor thanks to the flexibility provided by the multi sector unit approach, and due to the much simplified beam steering mechanism, the weight and/or the size and/or the cost of each sector unit may be reduced, thereby further contributing to the feasibility of the distributed LDIRCM system that is proposed by some embodiments of the invention.

Having described some advantages of a LDIRCM system which are associated with a more flexible positioning of the laser units, there is now provided a description of further advantages of a LDIRCM which are associated with the size of the sector which needs to be covered by a sector unit mounted on a platform in order to provide protection around the full perimeter of the platform, in accordance with some embodiments of the invention. As mentioned above, in a LDIRCM system according to some embodiments of the invention, which includes a plurality of sector units, in order to achieve protection around the full perimeter of the platform, each sector unit, when mounted on a platform, needs to cover a sector that is substantially less that 180° horizontally relative to the platform. A full perimeter protection is obtained by combining the coverage sector of each of the plurality of sector units, giving rise to a combined coverage sector which spans around the full perimeter of the platform. For example, a LDIRCM system may include four sector units. Each sector unit when mounted on the platform may be configurable to provide a coverage sector that is 100° (horizontally)×90° (vertically) relative to the platform. The four sector units may be mounted on the platform such that each one covers a substantially different sector relative to the platform (for example, with on 5° overlap between different sectors) so as to provide a total coverage sector that surrounds substantially the full perimeter of the platform.

A gimbal or other beam steering module which needs to cover a sector that is substantially less than 180° horizontally can give rise to greater design flexibility compared to a gimbal or other beam steering module which needs to cover 180° or even a full 360°. As can be appreciated, the design flexibility can be translated to a faster, smaller, lighter, lower cost and more reliable gimbal or other beam steering element. For example, a gimbal or other beam steering element which needs to enable a coverage sector that is 180° or above, needs to include two (or more) beam steering elements, for example, gimbals, and at least one of the beam steering elements needs to rotate about at least another beam steering element in order to provide enable the 180° coverage sector (or a greater coverage sector). It would be appreciated, that in order to enable the rotation of one beam steering element about another beam steering element relatively complex designs are required. Thus, the smaller sector size which needs to be covered by each sector unit in a LDIRCM system according to some embodiments of the invention, lends itself to a more flexible gimbal design.

As will be described in greater detail below, some aspects and some embodiments of the present invention relate to an innovative implementation of a gimbal or other beam steering element as part of a sector unit of a distributed LDIRCM system. It should be appreciated that the innovative implementation of a gimbal or other beam steering element that is suggested herein for being used as part of a sector unit of a distributed LDIRCM system (and which is described below) contributes towards a lighter and/or less expensive, and/or faster responding, and/or more accurate sector unit. As mentioned above, reducing the weight of each sector unit and/or the cost of each sector unit is necessary in order to provide a LDIRCM system which includes a plurality of sector units (for example, three sector units), each of which including at least one laser unit and a laser guidance module, without substantially increasing the total weight and cost of the system compared to a typical LDIRCM system.

Further advantages of a LDIRCM system, according to some embodiments of the invention, which include a plurality of sector units is associated with a possibility of using the plurality sector units (or some of which) simultaneously to tackle multiple threats approaching a protected platform. A LDIRCM system which includes a plurality of sector units, wherein each one of the plurality of sector units covers a substantially different sector relative to the platform may be capable of responding to multiple threats simultaneously. For example, in case a plurality threats are approaching a protected platform from different directions, a plurality of sector units which cover the sectors from which the threats are approaching may be utilized simultaneously to provide a simultaneous multi-threat jamming solution. It would be appreciated that a typical LDIRCM is not able to respond in such manner to a multiple threat scenario, and can only respond to one threat at any given time or up to two threats at any given time, in case two laser systems are included.

Furthermore, as mentioned above, a LDIRCM system according to some embodiments of the invention, may include a plurality of MWS sensor modules, and at least one of the MWS sensor modules may be configurable to detect a threat and also to track a detected threat in a manner to enable a sector unit to direct a laser beam onto the guidance system of the threat. Since in a LDIRCM system according to some embodiments of the invention, a MWS sensor module has a relatively large field of view, for example 70° or 100° horizontally, at which the MWS sensor module statically "stares" both for detection and tracking applications, when a plurality of threats are detected within a sector covered by the MWS sensor module, the MWS sensor module can simultaneously track the plurality of detected threats within its coverage sector and not only one threat at a time. The above discussion is also applicable to designated threat tracking modules in case such designated threat tracking modules are used in addition or as an alternative to the threat tracking function of the MWS sensor modules.

In a typical LDIRCM system, on the other hand, a tracking sensor usually has a relatively limited field of view of a few degrees and in order to track a detected threat, the tracking sensor is moved together with the progress of the threat. Thus, in a typical LDIRCM system, tracking a plurality of threat is virtually not possible.

Furthermore, it would be appreciated that pre-acquisition of a threat can contribute to a more rapid response to a detected threat, and thus, although a specific sector unit in a LDIRCM system according to some embodiments of the invention may not be able to simultaneously jam two or more threats, the MWS sensor module (or the threat tracking module) covering the sector associated with the sector unit may be configurable to track the two or more threats at the same time. Thus, when the sector unit is ready to tackle the next one of the plurality of threats that are within its coverage sector, the acquisition time is eliminated and the sector unit can take the necessary action in order thwart the next threat without delay. Furthermore, in accordance with still further embodiments of the invention, a coverage sector of a MWS sensor module may be covered at least in part by two or more sector units, and when a plurality of threat are detected within the coverage sector of the MWS sensor module, the handling of the threat may be divided amongst the sector units which cover the coverage sector of the MWS sensor module, and thus the threats within a sector that is covered by one MWS sensor module may be tackled simultaneously by two or more sector units whose coverage sector overlaps with at least a part of the coverage sector of the MWS sensor module.

It would be appreciated that the advantages associated with some aspects and some embodiments of the LDIRCM system of the present invention which were discussed above, were provided by way of example, and that the LDIRCM system according to the present invention may provide additional advantages. It should also be appreciated that some aspects and some embodiments of the LDIRCM system of the present invention may not be constrained by one or more of the advantages described above, and specifically, some aspects and some embodiments of the LDIRCM system of the present invention may provide only some or none of the advantages described above.

As was discussed above with respect to the advantages of a LDIRCM system which includes a plurality of sector units, having a plurality of sector units in a LDIRCM system may provide some design and performance advantages over a typical LDIRCM system. In order to enjoy the benefits of a distributed system, the total cost and weight of the distributed LDIRCM system (including the plurality of sector units) does not substantially exceed the cost of a typical LDIRCM system. In order to provide a LDIRCM system which includes a plurality of sector units (for example, three sector units), each of which including at least one laser unit, without substantially increasing the total weight and cost of the system compared to a typical LDIRCM system, the inventors of the present application make an innovative use of several technologies and of several innovative implementations of a LDIRCM system, some of which are directly or indirectly associated with the inclusion of a plurality of sector units in a LDIRCM system. Some of the innovative technologies and implementations referred to herein were discussed above with reference to the advantages of a distributed LDIRCM system. These and other technologies will be described in greater detail below.

This and more, innovative technologies developed by the inventors of the present invention have substantially contributed towards a lighter and cheaper sector unit. These innovative technologies have enabled the inventor of the present invention to make use of types of laser sources, which for various technical reasons were not suitable for being used in a LDIRCM system thus far. The innovative technologies which enable the LDIRCM system according to the various aspects and embodiments of the invention include, but are not limited to, an optical system for a cooled light source. A short description of some principles of this innovative technology is presented below. The innovative optical system for a cooled light source that is referred to above, is described in greater detail in Israeli Patent Patent Application No. IL177240, filed oil Nov. 29, 2005 (hereinafter: "IL177240"), and in PCT Patent Application No. IL2006/001378 (hereinafter: "IL2006/001378"), filed on Nov. 29, 2006, which are hereby incorporated by reference in their entirety.

In accordance with some embodiments of the invention, a laser unit, which is used as part of a sector unit in a LDIRCM that comprises a plurality of sector units, may be used with the optical system for a cooled light source that is described in IL177240 and IL2006/001378. It should be appreciated that the optical system for a cooled light source that is described in IL177240 and IL2006/001378 is provided here as one example of an innovative technology which contributes to the possibility of a LDIRCM system which includes a plurality of sector units.

A key contribution of the optical system for a cooled light source is the possibility of making an innovative use of a semiconductor laser in a LDIRCM system which includes a plurality of sector units, according to some embodiments of the invention. The inventor of the present invention has developed a way of using semiconductor laser technology, and specifically QCL technology which enable the use of a plurality of semiconductor laser units and specifically of QCL units as part of a LDIRCM system that is mountable on a platform, and specifically as part of a LDIRCM system that is mountable on an aircraft.

Usually, the current laser technology used in the relevant wavelength range (3-5 um which is also called Band IV) are OPO wavelength shifted solid state (or fiber) lasers. They are heavy, expensive and power consuming. The inventors of the present invention suggest in some embodiments of the invention to use semiconductor lasers to provide the laser energy required for jamming a guidance system of a threat. There are three basic types of semiconductor lasers: (1) Quantum Cascade Lasers (QCL) (2) Interband Cascade Lasers (ICL), and (3) externally pumped semiconductor lasers (EPSL), usually based on Antimonides. In accordance with further embodiments of the invention, fiber lasers that are configured to emit energy directly in the Band IV may also be used when such lasers become commercially available.

It would be appreciated that semiconductor lasers work better at low temperature. Semiconductor laser also need collimation. In IL177240 and IL2006/001378 there is described a cooling system for a semiconductor laser which comprises of an optical element within the cooler which collimates the laser into a substantially collimated beam. This cooling system is relevant for QCL, ICL and EPSL. Current state of the art QCLs are able to emit less than 1 Watt at room temperature, but over 1 Watt at cryogenic temperatures. In accordance with one embodiments of the invention, QCL are implemented within a sector unit, and provide the sector unit's laser energy source. Since a typical LDIRCM requires power in the Watts in order to effectively jam a threat, a cooling device which also performs collimation is an advantage.

It would be appreciated, that in the future, the QCL and other semiconductor Band IV lasers may achieve multiwatt performance at higher temperatures, which may reduce the need for such a cooling system.

Having provided some of the key technologies underlying some aspects and some embodiments of the invention, there is now provided a more detailed description with respect to some examples of some aspects and some embodiments of the present invention.

Figure 2A:
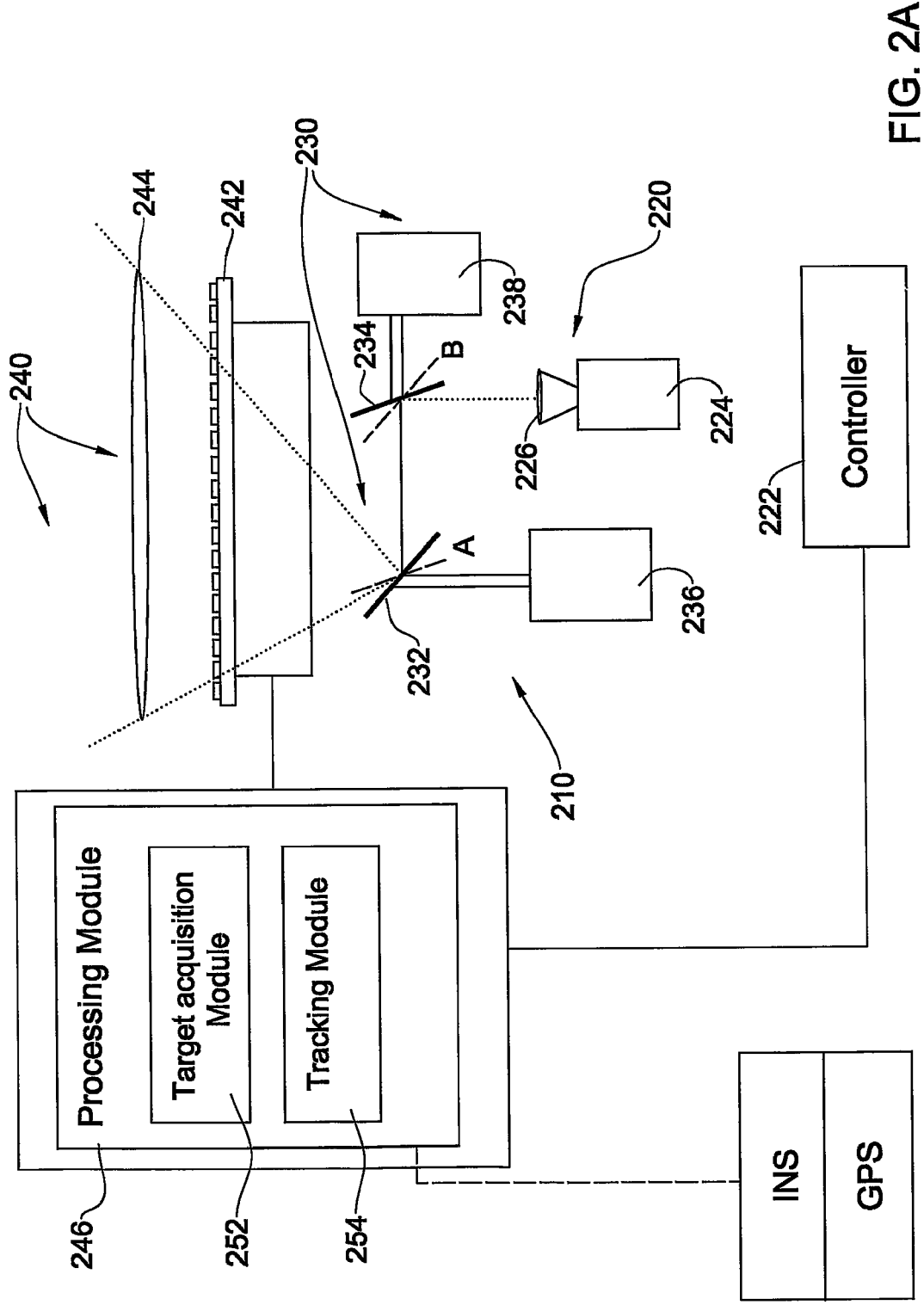
FIG. 2A is a block diagram illustration of a sector unit in a distributed LDIRCM system according to some embodiments of the invention and of a MWS sensor module that is associated with the sector unit in accordance with further embodiments of the invention.
Figure 2B:
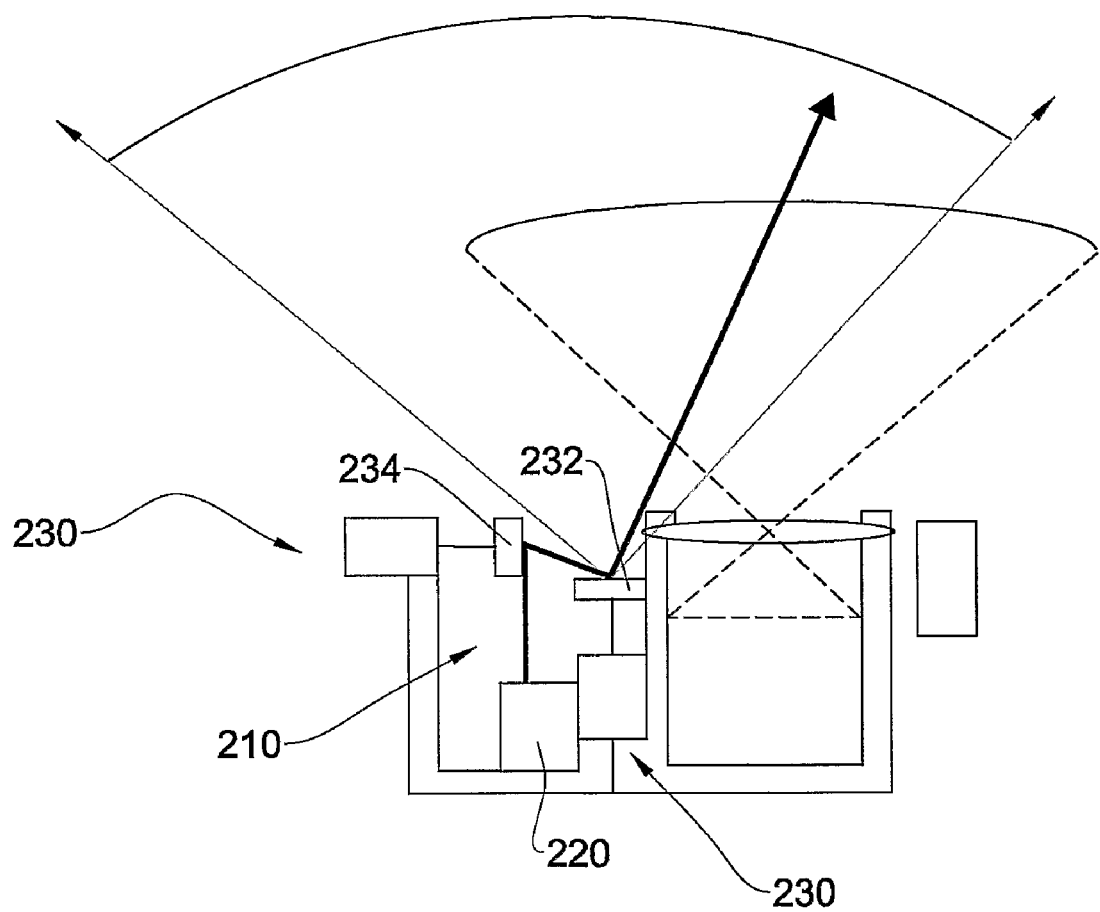
FIG. 2B is a block diagram illustration of a sector unit an associated MWS sensor module which are rigidly attached to one another and to a common chassis, according to some embodiments of the invention.

Reference is now made to FIG. 2A, which is a block diagram illustration of a sector unit in a distributed LDIRCM system according to some embodiments of the invention, and of a MWS sensor module that is associated with the sector unit in accordance with further embodiments of the invention. Additional reference is made to FIG. 2B which is a block diagram illustration of a sector unit an associated MWS sensor module which are rigidly attached to one another and to a common chassis, according to some embodiments of the invention. Some embodiments of the invention relate to a LDIRCM system which includes a plurality of sector units and a plurality of MWS sensor modules. The sector unit 210 and the MWS sensor module shown in FIG. 2A, and described herein with reference to some embodiments of the invention, is an example of a sector unit which may be used as part of a distributed LDIRCM system of the present invention. The sector unit 210 and the MWS sensor module shown in FIG. 2B correspond to the ones shown in FIG. 2A. For convenience and clarity, some of the components of the sector unit 210 and the MWS sensor module shown in FIG. 2A were omitted from the respect sector unit 210 and the MWS sensor module shown in FIG. 2B.

According to some embodiments of the invention, a sector unit may include a laser unit 220 and a laser guidance module 230. The laser unit 220 may be operatively coupled to the laser guidance module 220, as will be described in further detail below. According to some embodiments of the invention, the laser unit 220 may include a laser controller 222, an electromagnetic energy generator 224, a collimator 226 and a laser cooling unit 228.

The components of the laser unit 220 shown in FIG. 2A shall now be described with further detail. The laser controller 222 may be adapted to control various aspects of the operation of the laser unit 220. According to some embodiments of the invention, the laser controller 222 may be adapted to provide the electromagnetic energy generator 214 with the drive signals required for its operation, as well as controlling its working conditions, such as stabilization of its temperature.

The collimator 226 may be adapted to receive electromagnetic energy from the laser 224 and to produce a beam of parallel rays (a laser beam). For example, the collimator 226 may be adapted to apply an optical manipulation onto the electromagnetic energy that is emitted by the laser 224 and as a result, the electromagnetic energy existing the collimator consists mainly of parallel rays. It would be appreciated that the term "parallel" as used herein means that the rays are parallel in the sense that their direction is distributed within a relatively small divergence angle. However, it should be understood that the rays cannot be fully (100%) parallel, but rather may be substantially parallel to the extent of the beam divergence. The electromagnetic energy generator 224 and the laser cooling unit 228 will be described in greater detail below.

The laser 224 may be configured to receive energy, typically electricity, and translate the input energy to electromagnetic energy at a focused wavelength. For example, the laser 224 may be adapted to provide electromagnetic at a specific wavelength and this electromagnetic energy after being collimated if necessary provide the laser energy or laser beam that is the output of the sector unit.

There is now provided a more detailed description of specific embodiments of the invention which relate to lasers 224 which may be used as part of a LDIRCM system according to some embodiments of the invention. In accordance some embodiments of the invention, it is suggested to use a semiconductor laser as the laser 224. According to still further embodiments of the invention, it is suggested to use a semiconductor laser which emits energy in the Band-IV. Specifically, this semiconductor laser may be a Quantum Cascade Laser (hereinafter: "QCL"), such as the one developed by Northwestern university (Manijeh Razeghi et al, "Quantum cascade laser progress and outlook", Proceedings of SPIE, Volume 5617, 2004, pp. 221-232) and Alpes Lasers SA (Laser catalog number RT-P-FP-250-2140).

It would be appreciated by those of ordinary skill in the art, that semiconductor lasers in the Band-IV are based on manufacturing technologies which are similar to those used for manufacturing lasers for CD players or lasers for fiber communications. One unique aspect of a semiconductor laser in the Band-IV is associated with a specific thin-layer design, which engineers their electron energy levels to a wavelength within the Band-IV wavelength range. Only in recent years, the semiconductor thin layer growth machines (MBE—Molecular Beam Epitaxy or MOCVD—Metal Organic Chemical Vapor Deposition) have become accurate enough to realize the layer structure needed for producing Band-IV energy from semiconductor lasers.

Semiconductor lasers and specifically QCL provide benefits in terms of small size, (of the order of a few millimeters long), low weight, low manufacturing cost, high efficiency and high reliability. Thus, several of these lasers can be used in a LDIRCM system without significantly increasing the system size and cost. Furthermore, semiconductor lasers in band IV emit more power more efficiently at low temperature. Thus, semiconductor laser may be cooled using a TEC, or using a cryogenic cooler. U.S. Pat. No. 5,628,196. More details regarding some of the key advantages of using a semiconductor laser in a LDIRCM system according to some embodiments of the invention are provided below.

It would be appreciated that according to some embodiments of the invention, the use of a semiconductor laser which directly emits Band IV laser eliminates the need for an OPO wavelength conversion, or any other optical wavelength conversion mechanism. By eliminating the OPO wavelength converter that is typically a part of a laser system of a LDIRCM system for a sector unit of a LDIRCM system according to some embodiments of the invention, the weight of each sector unit in the LDIRCM system may be reduced.

In addition, the semiconductor lasers, and specifically QCL, which in accordance with some embodiments of the invention, are suggested for being used within a sector unit of a distributed LDIRCM system, may be directly modulated, whereas typically a laser unit in a conventional LDIRCM system requires external modulation.

Figure 3:
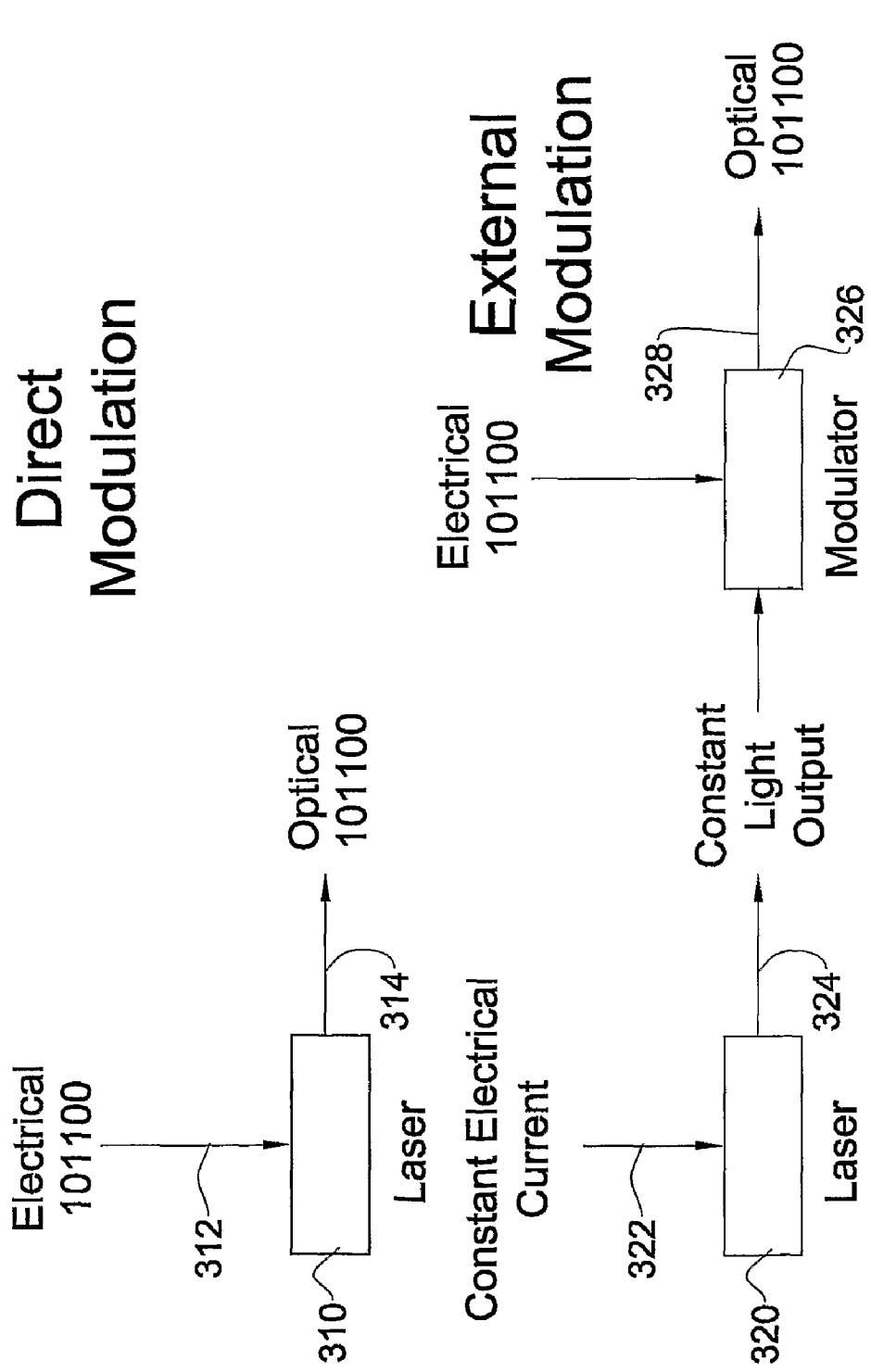
FIG. 3 is a simplified block diagram illustration of a laser unit being directly modulated in accordance with some embodiments of the invention versus a laser unit that is being externally modulated.

Reference is now additionally made to FIG. 3 which is a simplified block diagram illustration of a laser unit being directly modulated in accordance with some embodiments of the invention versus a laser unit that is being externally modulated. In FIG. 3, modulation is represented by a sequence of the digits '1' and '0' representing a series of "on" and "off" states, respectively. In a directly modulated laser unit 310, the amplitude modulation of the laser signal required for jamming the heat-seeking guidance system of a threat is obtained by modulating the input current 312 that is input to the laser 310, for example, in cooperation with the laser controller 222. Since the laser unit 310 supports direct modulation, the laser unit is able to translate the modulated input current into modulated laser energy 314. On the other hand, the externally modulated laser unit 320 is input with a constant electrical current 322 and produces constant un-modulated light 324, for example, either a CW laser radiation or a pulse train. Modulation is achieved by utilizing an external modulator 326, such as an external shutter, for example, which is either absorbing light or allowing it to pass to the output, according to a second electrical signal that is input to the modulator 326. The output of the modulator 326 is amplitude modulated light or laser energy 328.

The advantages of direct modulation compared to indirect modulation include energy savings (because no power is used when no output signal is required), weight, size and cost savings (the need for external modulator is eliminated). Direct modulation, is obtained through modulating the input current that is input to the laser, contributes even further towards a smaller lighter, less expensive, more efficient and more reliable laser unit for jamming the heat-seeking guidance system of a threat. In contrast, solid state lasers and fiber laser are typically indirectly modulated. Indirect modulation typically uses an external shutter which creates the amplitude modulation, while the laser needs to continuously operate.

As mentioned above, another advantage of a semiconductor laser is the size and weight of each laser unit. A semiconductor laser is typically 5×0.5×0.1 mm3 in size. With its cooling apparatus (TEC or cryogenic), it may become larger, for example, up to one litter and two kilograms. The use of a cooling apparatus is preferred because the output power of semiconductor lasers emitted in the Band IV wavelength region significantly improves at low temperatures. An OPO wavelength shifted laser for IRCM can typically weigh 5 kilograms and up to tens of kilograms, sizing several litters. Strict temperature regulation is required for the OPO nonlinear crystal.

Still further, the wall-plug efficiency, meaning the average output optical power divided by input electrical power, of a typical OPO wavelength shifted laser for a typical LDIRCM is typically a fractions of per-cents at most. The laser itself with the OPO typically has a only few per-cents wall plug efficiency, and the external modulation which is typically applied to the output of the laser unit typically reduces efficiency by a factor of ~5 (the power is lost in the modulator), decreasing the wall-plug efficiency by almost an order of magnitude. On the other hand, the wall-plug efficiency of a typical QCL may be as high as tens of per-cents. This gap can be explained, at least in part, by the energy saving elimination of wavelength shifting, and the enabling of direct modulation.

Despite the advantage of using a semiconductor laser technology and specifically of QCL technology, it has not been used so far in LDIRCM systems at least in part due to difficulties in achieving sufficient output energy, which currently requires cryogenic operating temperatures, while being able to achieve satisfactory collimation and overall sector unit weight, size and cost so as to offer an attractive alternative to current LDIRCM system. As mentioned above, applicant's IL177240 and IL2006/001378 disclose a suggested solution to this technical barrier. Moreover, applicant's IL177240 and IL2006/001378 allow for the incorporation of several laser units within a single cooling unit, contribution towards a further possible increase in the output power of a sector unit.

Having described the electromagnetic energy generator 224 which may be used as part of a LDIRCM system according to some embodiments of the invention, there is now provided a brief description of a laser cooling unit 228, in accordance with further embodiments of the invention. As mentioned above, according to some embodiments of the invention, the cooling unit described in IL177240 and IL2006/001378, may be used as part of the laser unit 220 in order to enable the cooling of the components of the laser unit 220. However, it would be appreciated, that the laser cooling unit described in IL177240 and IL2006/001378 is provided as an example of one possible cooling unit which may be used to cool the laser unit 220 while meeting the weight and/or size and/or cost requirements that are associated with a LDIRCM system which includes a plurality of sector units. Furthermore, according to further embodiments of the invention, a sector unit of a LDIRCM system according to some embodiments of the invention may include types of laser units which do not required any cooling or only very limited and conventional cooling in order to operate and to provide sufficient energy for jamming a guidance system of a threat. For example future developments in the field of QCL and ICL technologies may bring about laser units which are able to provide enough power at room temperature (or close to room temperature), thereby eliminating the need for cryogenic cooling, and allowing the use of more modest cooling technologies such as a TEC cooler. Accordingly, in accordance with further embodiments of the invention, any other suitable cooling unit which meets the performance and weight and/or size and/or cost requirements that are associated with a LDIRCM system which includes a plurality of sector units may be used to cool the laser unit.

A laser unit 220 according to various embodiments of the invention was described above in detail. There is now provided a detailed description of a laser guidance module according to some embodiments of the invention. According to some embodiments of the invention, a laser guidance module 230 may include at least one beam steering element. In the embodiment illustrated by FIG. 2, there is shown a laser guidance module 230 which includes a first and a second beam steering elements 232 and 234, respectively. According to some embodiments of the invention, the one or more beam steering elements may be rotatable about a first and a second axis. In the embodiment illustrated by FIG. 2A and FIG. 2B, the first beam steering element 232 is rotatable about a first axis A and the second beam steering element 234 is rotatable about a second axis B. An example of a single beam steering element, in accordance with some embodiments of the invention, that is rotatable about a first and a second axes shall be provided below.

As mentioned above, in a LDIRCM system according to some embodiments of the invention, each one of the plurality of sector units when mounted on a platform should be configurable to cover a sector that is substantially less than 180° horizontally. Therefore, a relatively straightforward beam steering element(s) may be implemented within a sector unit according to some embodiments of the invention. The beam steering element(s) 232-234 that is rotatable about a first and a second independent axes may be sufficient to direct a laser to any point within a sector that is less than 1800 over tenths of degrees. Independent axes us used herein means that the rotation of any rotatable axis does not cause the orientation of any other rotatable axis to change with respect to the platform. It would be appreciated that, typically, in order to achieve a coverage sector of 180° or more, the rotatable axes of the beam steering element(s) are configured in a way that the rotation of at least one rotatable axis cause the orientation of another rotatable axis to change with respect to the platform. It would be appreciated that typically in order to achieve a coverage sector of 180° or more, a rotation of a beam steering element(s) around a first rotation axis may cause the orientation of another rotatable axis to change relative to the platform (when the beam steering element is mounted on the platform)

According to one example of a laser guidance module 230 according to some embodiments of the invention, the laser guidance module may include two mirrors. For example, each of the two beam steering elements 232 and 234 shown in FIG. 2 may include a mirror. The first mirror (232) may be rotatable about a first axis A, and the second mirror (234) may be rotatable amount a second axis B. Each of the two mirrors 232 and 234 may be operatively connected to a different motor 236 and 238, respectively. Each one of the two motors 236 and 238 may be adapted to rotate the mirror 232 and 234, respectively, attached thereto. The first motor 236 may be adapted to rotate the first mirror 232 about a first axis A. The second motor 238 may be adapted to rotate the second mirror 234 about a second axis B. The motors 236 and 238 may be configured to rotate or manipulate the mirrors 232 and 234 so that a laser beam that in incident on the mirrors can be directed to any point within a sector that is substantially less than 180° over tens of degrees.

According to some embodiments of the invention, the two motors 236 and 238 may be rigidly fixed one with respect to the other, so that the rotation of one motor does not effect the position of the other motor. It would be appreciated that a laser guidance module which is based upon two motors which are rigidly fixed one in respect of the other can contribute to a lighter guidance module design since the mass and inertia of the motor can be significantly reduced, giving rise to a greater steering speed, size reduction and reduced power consumption and greater accuracy. Such beam steering devices are sold by Nutfield Technologies, Inc. (Windham, USA), Cambridge Technologies (Tullamarine, Australia) and others for different applications.

Figure 4:
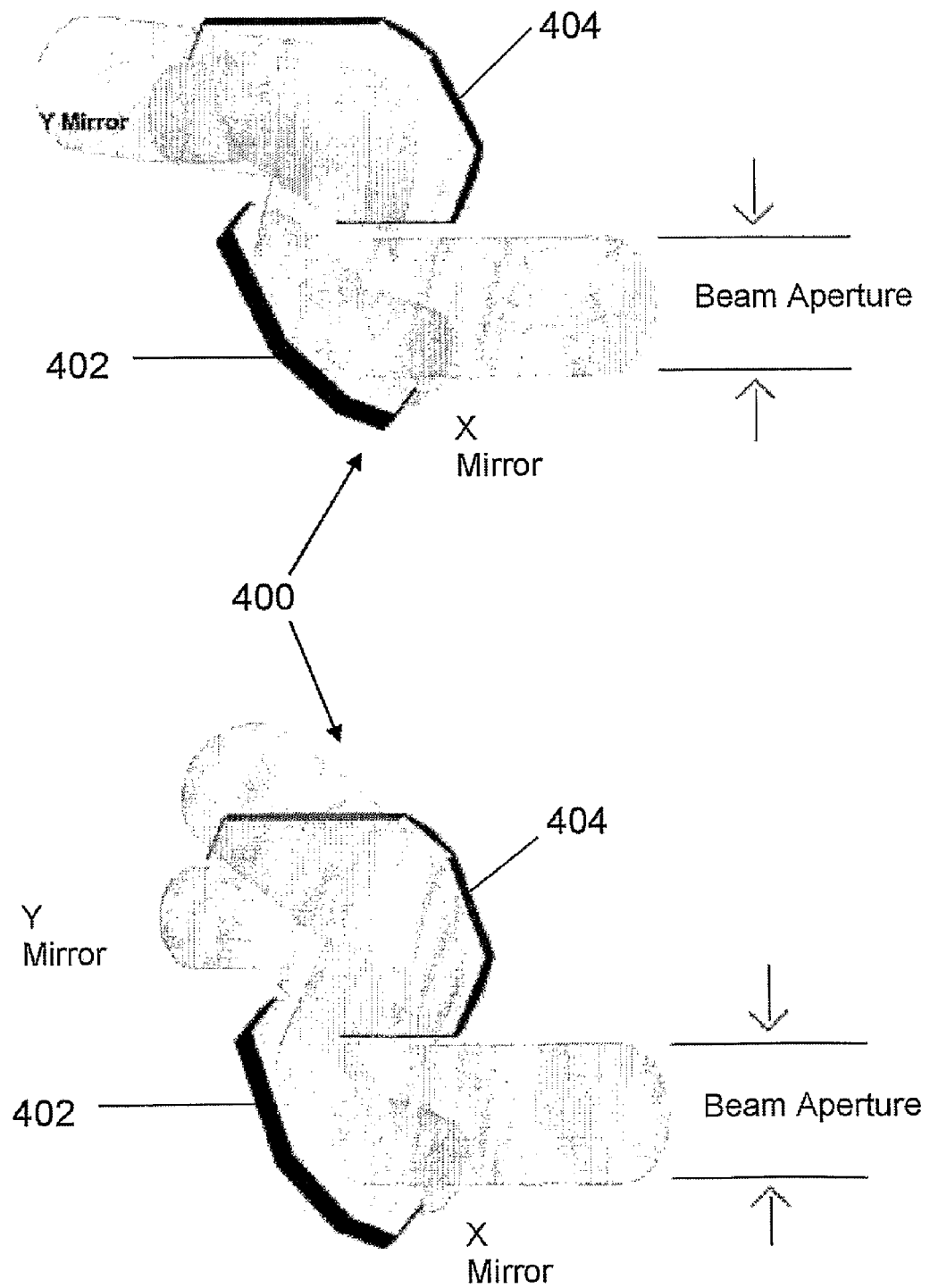
FIG. 4 is a block diagram illustration of an assembly of two mirrors which may be used as part of a sector unit in a distributed LDIRCM system according to some embodiments of the invention.

Reference is now made to FIG. 4, which is a block diagram illustration of an assembly of two mirrors which may be used as part of a sector unit in a distributed LDIRCM system according to some embodiments of the invention. In FIG. 4, there is shown a portion of a laser guidance module of a sector unit in a distributed LDIRCM system according to some embodiments of the invention. According to some embodiments of the invention the laser guidance module includes an assembly 400 of two mirrors 402 and 404. The two mirror assembly 400 may be used as part of a sector unit that is part of distributed LDIRCM system according to some embodiments of the invention. The two mirrors 402 and 404 may be configured so that a laser beam from a laser unit (not shown) is reflected from the surface of the mirrors 402 and 404. According to further embodiments of the invention, the two mirrors 402 and 404 may be rigidly fixed one in respect of the other. Accordingly, the rotation axis of each of the two mirrors 402 and 404 may be rigidly fixed in space one with respect to the other, and when the mirrors 402 and 404 are mounted on a platform, the direction of the rotation axis of each of the mirrors may be rigidly fixed relative to the platform.

According to some embodiments of the invention, the two mirrors 402 and 404 may be rotatable about a first and a second axis, respectively, in a manner to enable directing a laser beam incident thereupon to any point within a sector that is substantially less than 180° over tens of degrees. In FIG. 4, there are shown only two of many possible beam steering angles within a sector that is substantially less than 180° over tens of degrees which a two degrees of freedom mirror assembly can provide by rotating the mirrors. When a beam is shone towards the two mirror assembly 400, the beam hits the first mirror 402 of the beam steering assembly 400, the beam is reflected from the first mirror 402 onto the surface of the second mirror 404. The laser beam is reflected from the second mirror 404 towards a target that is within a coverage sector that is associated with the sector unit within which the mirror assembly is implemented.

The incidence angel of the laser beam on the first mirror 402 may be determined by a controller, for example based upon tracking data received from an associated MWS sensor module. The first mirror 402 may be configured to rotate the laser beam over a first axis. The size of the first mirror 402 may be larger than the cross section of the beam in order to avoid clipping in shallow incident angles, and to allow for integration tolerances. The laser beam may be reflected off the first mirror 402 onto the surface of the second mirror 404. Thus, the incident angel of the laser beam on the second mirror 404 is determined, at least in part, by the angle of rotation of the first mirror 402. The second mirror 404 (or a motor used for rotating the second mirror) may also receive instructions from a controller as to its desired angle of rotation. The second mirror 404 may be configured to rotate the laser beam over a second axis. According to some embodiments of the invention, the size of the second mirror 404 may be large enough to accommodate for all of the rotating range of the first mirror, in addition to the constrains of the first mirror 402. The light energy that is reflected from the first mirror onto the surface of the second mirror is thus reflected by the second mirror out of the sector unit, for example, towards a guidance system of a detected threat. According to some embodiments of the invention, the direction of the laser beam existing the mirror assembly 400 is determined, at least in part, by the rotation of both the first and second mirror 402 and 404, and different rotation combinations may cause the laser beam to be directed to at different directions.

A second example of a laser guidance module 230 according to some embodiments of the invention is based on a single mirror, or any other suitable optical manipulation element, mounted on two or more poles that can change their effective length and thus rotate the mirror. According to some embodiments of the invention, the poles may be extended or retracted in a manner to enable the mirror to direct a laser beam incident thereupon to substantially any point within a sector that is substantially less than 180° over tens of degrees. According to further embodiments of the invention, one of the poles may be fixed in length and the extension retraction of one of the poles may be sufficient to provide the substantially less than 180° over tens of degrees coverage sector.

According to some embodiments of the invention, the poles may connectable to a common rigid base via a rigid attachment; or via a two degree of freedom attachment; or via a two axis degrees of freedom attachment. The poles may be connectable to the mirror base using a common rigid base via a rigid attachment; or via a two degree of freedom attachment; or via a two axis degrees of freedom attachment. The poles may include, but are not limited to, linear motors, solenoids, piezo-electric actuators, or other technologies.

Figure 5:
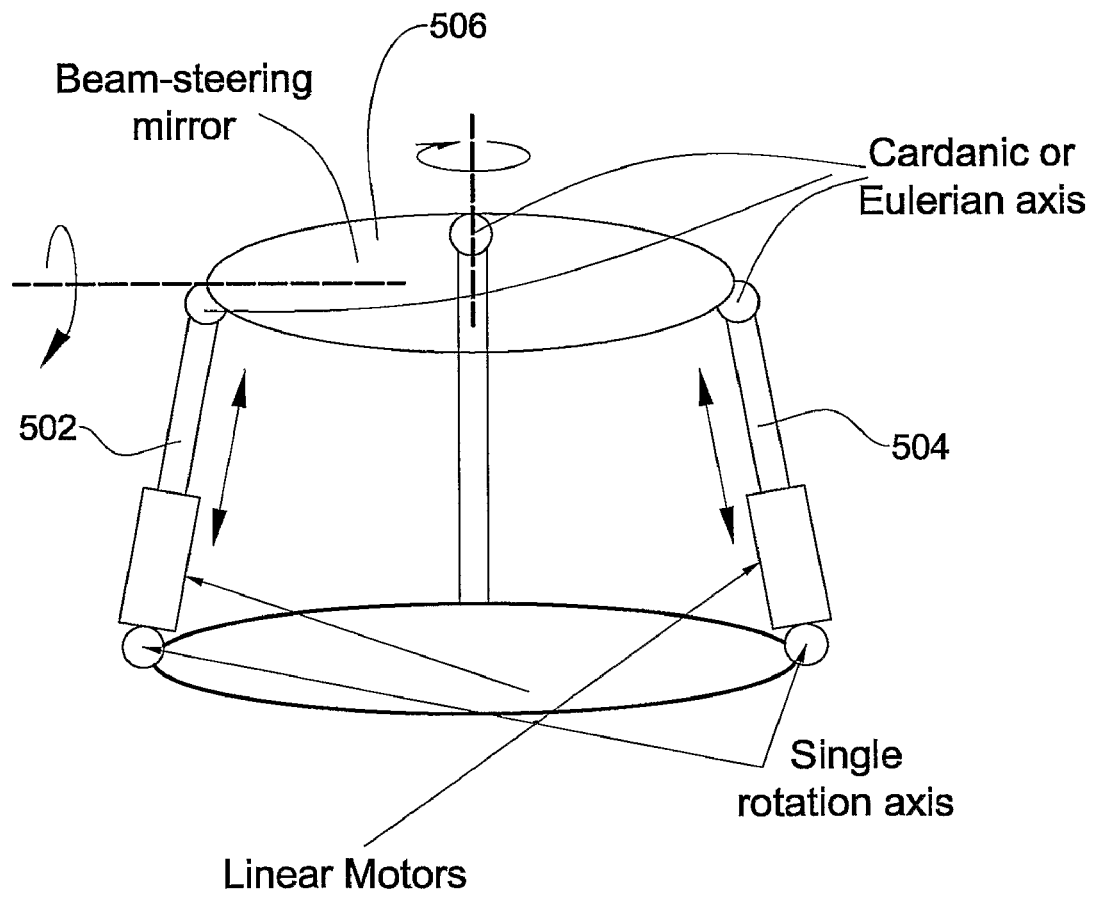
FIG. 5, which is a block diagram illustration of an assembly including a mirror mounted on two poles, at least one of which being configurable for change its effective length and thus rotate the mirror, the assembly being a part of a sector unit in a distributed LDIRCM system according to some embodiments of the invention.

Reference is now made to FIG. 5, which is a block diagram illustration of an assembly including a mirror mounted on two poles, at least one of which being configurable for change its effective length and thus rotate the mirror, the assembly being a part of a sector unit in a distributed LDIRCM system according to some embodiments of the invention. In FIG. 5, there is shown a portion of a laser guidance module of a sector unit in a distributed LDIRCM system according to some embodiments of the invention. According to some embodiments of the invention the laser guidance module includes an assembly 500 which include two poles 502 and 504, at least one of which being configurable to change its effective length, and a mirror 506. The mirror 506 may be operatively connected to the poles 502 and 504. The mirror 506 may be configured so that a laser beam from a laser unit (not shown) is reflected from the surface of the mirror 506. Examples of possible connections which are suitable for connecting the mirror 506 to the two poles 502 and 504 are described above.

According to some embodiments of the invention, by extending or retracting at least one of the poles 502 and 504, the mirror 506 can be rotated with two degrees of freedom. According to some embodiments of the invention, the poles 502 and 504 may be configured to enable to rotate the mirror 506 about a first and a second axis, respectively, in a manner to enable directing a laser beam incident thereupon to substantially any point within a sector that is substantially less than 180° over tens of degrees.

The two poles 502 and 504 may be configured to rotate the mirror 506 over a first axis and a second axis. The extension/retraction of the pole(s) and consequently the incidence angel of the laser beam on the mirror 506 may be determined by a controller, for example based upon tracking data received from an associated MWS sensor module. The size of the mirror 506 may be larger than the cross section of the beam in order to avoid clipping in shallow incident angles, and to allow for integration tolerances. The light or laser beam that is incident upon the mirror 506 may be reflected by the mirror 506 in a desired direction, for example, towards a guidance system of a detected threat. According to some embodiments of the invention, the direction of the laser beam existing the assembly 500 is determined, at least in part, by the extension/retraction of the pole(s), and levels of extraction/retraction may cause the laser beam to be directed to at different directions.

Referring back to FIG. 2, having described in detail some embodiments of the invention which relate to various sector unit 210 implementations there are now provided further details in respect of various embodiments of the invention which relate to various MWS sensor module 240 and MWS system implementations. According to some embodiments of the invention, a MWS sensor module 240 may include a MWS imaging sensor 242, an optical element 244, a signal processing module 246 and a data communication module 248.

The imaging sensor 242 may include an array of photodiodes sensitive to energy in the MWIR or SWIR, which is emitted by the threat, and its respective proximity electronics (read out circuit, analog to digital converter, image correction module etc.). The imaging sensor may 242 be adapted to translate incident light into electronic signals.

The optical element 244 may be adapted to Image the radiation from the field of view of the MWS (typically, 100 degrees by 90 degrees) on the imaging sensor.

The signal processing module 246 may be operatively connected to the MWS imaging sensor 242. The signal processing module 246 may be configured to receive a digital or an analogue signal from the MWS imaging sensor 242, which corresponds to the visual data collected by the sensor 242. The signal processing module 246 include a target acquisition module 252 and a tracking module 254. According to some embodiments of the invention, the target acquisition module 252 may be adapted to process the signal received from the MWS imaging sensor 242 to determine whether the signal includes a signature of a threat, and possibly determine if the detected threat is directed towards the platform.

As mentioned above, the target acquisition module 252 may be adapted to receive a signal from a MWS imaging sensor 242 and to process the signal to determine whether it include a signature of a threat that is directed towards the platform. Processing a signal received from an imaging sensor to determine whether the signal includes a signature of a threat and for obtaining other data about a detected threat is well known. Any currently available or yet to be devised in the future method of process signals received from an imaging sensor in to determine whether the signals include a signature of a threat may be used as part of some embodiments of the invention. This may be done by applying time dependent and spatial filters on the image that extract statistically significant bright point objects with respect to the background. The target acquisition module may also track the detected threat in order to verify whether it is a threat (and not a random noise, or a hot target that does not have the trajectory of a threat), and whether it is aimed at the platform. According to further embodiments of the invention, the target acquisition module 252 may be further adapted to provide in respect of a detected threat one or more of the following: the relative direction of a detected threat (which may be determined by the location of the pixel where the threat was detected within the imaging sensor), an estimated time to impact, and additional information which may assist in identifying a detected threat.

As mentioned above, the signal processing module 246 of the MWS sensor module 240 may also include a tracking module 254. According to some embodiments of the invention, the tracking module 254 may be adapted to continuously perform the detection process, analyzing the series of detection events of the same threat, generating a trajectory of the threat, possibly using data from the navigation system, using data from the navigation system to translate the location data from the sensor platform and/or ground axis, applying an estimation technique such as the Kalman Filter to generate estimation to the current or future location of the threat, generating tracking data to sector unit which may take into account its delay in the estimation of the location of the threat.

The tracking data from the tracking module 254 may be used to enable a sector unit 210 to direct a laser beam onto a guidance system of a detected threat that is determined to be headed towards a platform on which a LDIRCM system 200 according to some embodiments of the invention is mounted. According to still further embodiments of the invention, a MWS sensor module 240 may be adapted to send the tracking data to a specific one of a plurality of sector units which are part of a distributed LDIRCM system, so as to enable that sector unit to direct a laser beam onto the laser guidance system of a detected threat that is headed towards a platform on which the LDIRCM system is mounted.

According to some embodiments of the invention, the MWS system may include a central controller (not shown) which may be adapted to manage some aspects of the operation of the plurality of MWS sensor modules. For example, the central controller of the MWS system may be adapted to coordinate the operation of the plurality of MWS sensor modules. Thus, in case a threat is detected in a position relative to a platform which is covered by two different MWS sensor modules, the MWS central controller may determine which one of the MWS sensor modules is to be assigned with the mission of tracking the threat and providing the tracking data to a sector unit in a manner to enable the sector unit to direct a laser beam onto a guidance system of the threat. The MWS central controller may also be connected to additional systems mounted on the platform including for example navigational systems and may augment the data from a MWS sensor module with the data obtained from the additional systems. For example, the MWS central controller may be connected to an aircraft's inertial navigation system (INS) and global positioning system (GPS) and may augment the tracking data generated by a MWS sensor module with corresponding data received from the INS and GPS systems.

Having provided a general description of the components of a MWS sensor module and the basic functionality of each component, there is now provided a discussion of the various imaging sensor technologies which may be implemented as part of a MWS sensor module in a LDIRCM system according to some embodiments of the invention. It would be appreciated that some of the MWS sensor module implementations discussed below may contribute towards a MWS sensor module's price, size, weight and/or power consumption. According to some embodiments of the invention, the imaging sensors 242 proposed for being used as part of a MWS sensor module 240 may provide several benefits with a cost of increased noise levels. As will be explained in further detail below, the increased nose levels are acceptable or are made acceptable according to some embodiments of the invention. A key benefit of some of the proposed MWS sensor module implementation is associated with eliminating the need for cryogenic cooling. Instead, according to some embodiments of the invention, there is proposed a MWS sensor module 240 which may receive Thermo-Electric Cooler (TEC) (not shown), or another low cost and cooling solution. According to further embodiments of the invention, there is provided a MWS sensor module which may operate without being cooled.

According to some embodiments of the invention there may be provided a MWS sensor module 240 that is based on relatively recently developed imaging sensor technologies for Mid-Infrared sensors. The recently developed imaging sensor technologies for Mid-Infrared sensors are satisfied with TEC cooling and do not require cryogenic cooling. Examples of imaging sensor technologies for Mid-Infrared that are satisfied with TEC cooling and do not require cryogenic cooling include, but are not limited to: PbSe detectors, Auger recombination suppressed MCT (Mercury Cadmium Telluride), such as the detector technology developed by Vigo Systems S.A. (Warsaw, Poland), InAsSb detectors, developed at the Center of Quantum Technology at the Northwestern University (Evanston, Ill., USA).

In accordance with certain embodiments of the invention, the higher noise level of the detectors mentioned above, compared to cryogenically cooled detectors, such as InSb or MCT detectors, for example, may not undermine the functionality of the detector as an MWS/tracker solution in a distributed LDIRCM system according to embodiments of the present invention. This can be explained, at least in part by the following: A MWS sensor module that is based on cryogenically cooled detector is limited, at least in part, by the detector's clutter rather than by its internal noise. Therefore, an increase in the noise level of the imaging sensor may not necessarily substantially reduce the performance of the MWS sensor module.

Furthermore, when a MWS sensor module is used as a tracker which is not beam-steered with the laser, such as is being proposed in accordance with some embodiments of the invention, the fast reaction time of the tracker allows the missile to be detected at a shorter range, because less time needs to be allocated to steer the laser beam towards the missile. It would be further appreciated that, when a reliable and responsive laser and gimbal systems are used in conjunction with the MWS sensor module, such as is suggested in accordance with some embodiments of the invention, a relatively high rate of false-alarms may be acceptable. A more reliable and more responsive laser and gimbal systems can recycle rapidly enough to enable multiple attempts at jamming a detected threat, so that there is higher tolerance towards tracking errors, and specifically towards tracking errors which result from a relatively high noise level. Conventional LDIRCM systems, whose gimbal (or other beam steering element) is slower, for example, of the order of several tens of a second to aim to a given direction, and therefore a false alarm may increase the time to aim at a true target, because the gimbal may be aiming at a false alarm at the other direction. This issue is augmented with the long time of standby to operation of OPO shifted solid state lasers, which may also be measured in tens of seconds. High false alarm rates may practically require the laser to operate continuously, and significantly reduce its already limited reliability. The semiconductor lasers, which are proposed as part of some embodiments of the invention, may begin operation within a very short time from standby, and have the potential to be significantly more reliable from their solid-state alternatives.

Additionally, according to some embodiments of the invention the MWS system may be used in conjunction with backup threat detection and/or threat tracking systems, such as a radar MWS system for example. It would be appreciated that the use of a backup threat detection and/or threat tracking system may provide another layer of filtering so that in some cases, a false alarm received from a MWS sensor module may be rejected based upon a cross reference with data from the backup system. Accordingly, when the MWS is used in conjunction with a backup system a higher false-alarm rate may be allowed.

Yet further, it would be further appreciated, that according to some embodiments of the invention, a tracking application of a MWS sensor module may be inherently less sensitive the noise level of the data from the imaging sensor. The tracking application inherently less sensitive the noise level of the data from the imaging sensor for at least the following reasons: the tracking of a threat is initiated and performed at a shorter range than the detection of the threat; tracking use more samples of the threat, and therefore can accommodate with lower Signal To Noise (SNR) and Signal To Clutter (SCR) than detection; windowing may be used, further increasing the number of samples the tracking is using as its baseline.

In the above discussion, reference was made Mid-Infrared sensors as an example of recently developed imaging sensor technologies which may be implemented in a MWS sensor according to some embodiments of the invention. There is now provided a description of an innovative implementation of short wave infra-red (SWIR) sensor technology to provide an imaging sensor in a MWS sensor module according to some embodiments of the invention. In accordance with some embodiments of the invention embodiments, a MWS sensor module may include an array of short wave infra-red (hereinafter: "SWIR") sensors. The SWIR sensors may be configurable to operate in the SWIR range (1-3 μm).

According to some embodiments of the invention, an array of SWIR sensors may receive sufficient cooling from a TEC cooling unit. Thus, according to some embodiments of the invention, a MWS sensor module may include a TEC cooling unit for cooling an imaging sensor of the MWS sensor module. Examples of TEC cooled SWIR detectors which may be used as part of a MWS sensor module according to some embodiments of the invention may include, but are not limited to, InGaAs SWIR sensors, or MCT SWIR sensors.

It would be appreciated that by including imaging sensors which require only TEC cooling, thereby eliminating the need for a MWS sensor module which includes cryogenic cooling, a lighter and/or smaller MWS sensor module may be achieved. A lighter and/or smaller MWS sensor module may contribute towards a distributed LDIRCM system according to some embodiments of the invention which maintains a total system cost, size and weight which are close to those of a typical LDIRCM system.

Having described various imaging sensor technologies which may be implemented as part of a MWS sensor module in a LDIRCM system according to some embodiments of the invention, there is now provided a description of further aspects of the invention, which are associated with the tracking capabilities that can be obtained from a MWS sensor module that is used in conjunction with a sector unit in a distributed LDIRCM according to some embodiments of the invention.

As was mentioned above, according to some embodiments of the invention, a LDIRCM system mountable on a platform may include a MWS sensor module that is configurable to provide threat detection and threat tracking capabilities within a specific sector relative to the platform. As was also mentioned above, according to some embodiments of the invention, a LDIRCM system mountable on a platform may include a sector unit that is configurable to provide threat jamming capabilities in respect of a threat located within a sector relative to the platform that is substantially less than 180° over tens of degrees. According to an aspect of the invention, a MWS sensor module may be mountable on the platform such that while a threat is detected within a sector relative to the platform that is associated with a sector unit from said plurality of sector units, the instantaneous filed of view (hereinafter: "IFOV") of each pixel of an imaging sensor of the MWS sensor module is smaller than the full width half max (hereinafter: "FWHM") far field divergence angle of a laser beam generated by a laser unit of the sector unit.

Reference is now made to FIG. 6A, which is a graphical illustration of instantaneous filed of view of a pixel of an imaging sensor of a MWS sensor module that is part of a LDIRCM system according to some embodiments of the invention. In FIG. 6A, there is shown an array of sensors 602 which are part of an imaging sensor of a MWS sensor module and an imaging optical element 604, for example an imaging lens, positioned in the optical path of the sensors array 602. The optical element 604 may be adapted to collect ambient light and to focus the ambient light onto the array of sensors 602. The inverse tangence of the width of the sensors array 602 divided by the effective focal length of the imaging optical element 604 may define a total field of view (hereinafter "FOV") of the MWS sensor module:

FIG. 6A provides an illustration of an IFOV of one pixel 606 in an array of sensors which may be part of a MWS sensor module or as part of an array of sensor which is part of a designated threat tracking sensor, according to some embodiments of the invention. The IFOV of the pixel 606 is defined by the horizontal pitch of the pixel (the distance between two centers of adjacent sensors), denoted by 'P', when divided by the focal length of the imaging optical element, denoted by 'f':

$$IFOV = \tan^{-1}\left(\frac{P}{f}\right) \cong \frac{P}{f} \quad \text{(Equation 1)}$$

The inverse tangence of the width of the sensors array 602 denoted by 'W' divided by the effective focal length of the imaging optical element 604 may define a total field of view (hereinafter "FOV") of the MWS sensor module:

$$FOV = \tan^{-1}\left(\frac{W}{f}\right) \quad \text{(Equation 2)}$$

Reference is now made to FIG. 6B which is a block diagram illustration of a divergence of a laser beam which may be generated by a sector unit that is part of a LDIRCM system according to some embodiments of the invention. An electromagnetic energy generator 612 generates electromagnetic energy. The electromagnetic energy is received by a collimating lens 614 which collimates the electromagnetic energy, thereby giving rise to a laser beam. The laser beam travels through the atmosphere and at some point begins to divert. The diversion of the laser beam from the beam centerline at half max far field is denoted in FIG. 6B by the Greek letter 'θ'.

Reference is now made to FIG. 6C, which is a graph illustrating the divergence angle of the laser beam shown in FIG. 6B. As can be seen in FIG. 6C, the full width half max far field divergence angle of the laser beam shown in FIG. 6B is marked by the horizontal line at the mid height point of the field-divergence angle distribution graph.

As mentioned above, a plurality of MWS sensor module and a plurality of sector units of a LDIRCM system according to some embodiments of the invention may be mountable on a platform. According to further embodiments of the invention, a MWS sensor module whose detection/tracking coverage sector overlaps at least with a portion of a sector covered by a sector unit may be adapted to provide the sector unit with data in respect of a location and/or direction of the detected threat, whereby while the threat is within the overlapping sector (defined by the overlap between the detection/tracking coverage sector of the MWS sensor module and the sector covered by the sector unit), the IFOV of each pixel provided by the MWS sensor module may be smaller than the FWHM far field divergence angle of a laser beam generated by a laser unit of the sector unit. According to still further embodiments of the invention, the MWS sensor module whose detection/tracking coverage sector overlaps at least with a portion of a sector covered by a sector unit may be adapted to provide the sector unit with data in respect of a location and/or direction of the detected threat so as to enable the sector unit to direct a laser beam towards a guidance system of the detected threat.

As mentioned above, a LDIRCM system which includes a plurality of MWS sensor modules and a plurality of sector units may be mountable on a platform such that a MWS sensor module (or threat tracking sensor) is rigidly fixed to the platform and is also rigidly attached to a sector unit. The MWS sensor module may be adapted to detect a signal which include a signature of a threat that is directed towards the platform and may be further adapted to provide the sector unit to which it is rigidly with tracking data in order to enable the sector unit to track the detected threat. The MWS sensor module may be adapted to provide the sector unit with tracking data so as to enable the sector unit to direct a laser beam onto the guidance system of the detected threat. According to some embodiments of the invention, a MWS sensor module may be adapted to provide a sector unit to which it is rigidly attached with tracking data in respect of a detected threat (data in respect of a location and/or direction of the detected threat). To assure that the tracking data may be accurate enough for aiming the laser beam on the threat, the IFOV of each pixel provided by the MWS sensor module is smaller than the FWHM far field divergence angle of a laser beam generated by a laser unit of the sector unit. It would be appreciated that when a MWS sensor module is rigidly attached to a sector unit, the misalignment between the MWS sensor module and the sector unit can be substantially reduced and possibly the mechanical misalignment may be virtually eliminated.

There is now provided, a description of another aspect of the invention which is associated with the tracking capabilities that can be obtained from a MWS sensor module that is used in conjunction with a sector unit in a distributed LDIRCM system according to some embodiments of the invention. As mentioned above, a plurality of MWS sensor module and a plurality of sector units of a LDIRCM system according to some embodiments of the invention may be mountable on a platform. According to further embodiments of the invention, a MWS sensor module whose detection/tracking coverage sector overlaps at least with a portion of a sector covered by a sector unit may be adapted to provide the sector unit with data in respect of a location and/or direction of the detected threat, whereby while the threat is within the overlapping sector (defined by the overlap between the detection/tracking coverage sector of the MWS sensor module and the sector covered by the sector unit), the data provided by the MWS sensor module is associated with an angular error that is substantially smaller than the far field divergence angel of the laser beam generated by the sector unit.

As mentioned above, a LDIRCM system which includes a plurality of MWS sensor modules and a plurality of sector units may be mountable on a platform such that a MWS sensor module is rigidly fixed to the platform and is also rigidly attached to a sector unit. The MWS sensor module may be adapted to detect a signal which includes a signature of a threat that is directed towards the platform and may be further adapted to provide the sector unit to which it is rigidly with tracking data in order to enable the sector unit to track the detected threat. According to some embodiments of the invention, a MWS sensor module may be adapted to provide a sector unit to which it is rigidly attached with tracking data in respect of a detected threat (data in respect of a location and/or direction of the detected threat), and the tracking data may be accurate enough so that the angular error associated with the tracking data is smaller than the far field divergence angle of a laser beam generated by a laser unit of the sector unit. It would be appreciated that when a MWS sensor module is rigidly attached to a sector unit, the misalignment between the MWS sensor module and the sector unit can be substantially reduced and possibly the misalignment may be virtually eliminated.

In another embodiment of this invention, there is proposed the use windowing to enhance threat tracking speed and possibly tracking reliability. As mentioned bellow, it is advantageous to use fast tracking loops, to increase the tracking accuracy in order to reduce the beam divergence. In conjunction with a fast gimbal, the tracker needs to provide quickly refreshed location data about the threat. Typically, the frame rate is limited by the output channel of the read-out circuit of the detector of the tracker. A windowing option is offered in according with some embodiments of the invention, where the detector can provide higher frame rate for a window whose size is smaller than the full frame size, so that the refresh time of the data provided for that window is higher, while the total data-rate for the pixels in the chosen window is equal or smaller that the data-rate of the pixels in the full frame size. For example: in a 256×256 pixels detector with 100 Hz frame rate, the pixel data rate is 256×256×100=6.55M pixel/second. If a windowing option is provided for a 50×50 pixels window at 1000 Hz, the pixel data rate is 50×50× 1000=2.5M pixel/second. The location of the window is updated externally. In some cases, more than one window can be defined simultaneously. The tracking loop in this case includes an initial detection of the missile within the full frame, and then defining a window which is centered at the location of the detected missile. The tracker can then provide refresh rate about the location of the missile which is significantly higher than the refresh rate of the full frame. The location of the window may be updated with the changes of the location of the missile with respect to the center of the frame of the tracker.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A laser directed infrared countermeasures "LDIRCM") system mountable on a platform, comprising:
a plurality of operatively independent sector units, each sector unit comprising:
a semiconductor laser unit adapted to produce a laser beam for jamming a guidance system of a threat;
a controller for controlling operation of the semiconductor laser unit and for providing drive signals to the semiconductor laser unit;
a laser guidance module, the laser guidance module being adapted to steer at least the laser beam generated by the semiconductor laser unit towards the threat, thereby enabling jamming of a threat within a certain sector relative to the platform, and
a plurality of threat detection and tracking modules mountable on the platform, such that each one of the plurality of threat detection and tracking modules is configured to detect a threat located within a different sector relative to the platform, which results in a combined threat detection and tracking capability that covers substantially the full perimeter of the platform, and
wherein the sector units are mountable on the platform, such that each one of the plurality of operatively independent sector units is configured upon receiving electrical energy to operate independently to provide a jamming capability for a threat located within a respective sector relative to the platform, which results in a combined missile jamming capability that covers substantially a full perimeter of the platform, and
wherein at least one threat detection and tracking module of the plurality of threat detection and tracking modules is rigidly attachable to one or more of the plurality of operatively independent sector units that are mounted on the platform, such that tracking data provided by the at least one threat detection and tracking module to the sector unit is substantially unaffected by physical distortions of the platform.

2. The LDIRCM system according to claim 1, wherein the semiconductor laser unit includes a semiconductor laser that is configurable to provide a laser beam at a wavelength from 3 μm-5 μm.

3. The LDIRCM system according to claim 1, wherein the semiconductor laser unit includes a laser selected from a group consisting of a quantum cascade laser; an interband cascade laser; and an externally pumped semiconductor laser that is configurable to provide a laser beam at a wavelength from 3 μm-5 μm.

4. The LDIRCM system according to claim 1, wherein the at least one threat detection and tracking module comprises an array of staring detectors, and wherein the at least one threat detection and tracking module is rigidly attachable to one or more of the plurality of operatively independent sector units while mounted on the platform, such that an angular error between a location of a threat as represented by tracking data provided by the at least one threat detection and tracking module and a centerline of the laser beam directed by the one or more sectors units based upon the tracking data towards the threat as represented by tracking data, is smaller than a far field divergence of the laser beam.

5. The LDIRCM system according to claim 1, wherein the at least one threat detection and tracking module is rigidly attachable to one or more of the plurality of operatively independent sector units while mounted on the platform, such that an instantaneous field of view ("IFOV") of each pixel of the at least one threat detection and tracking module is smaller than a full width half max ("FWHM") far field divergence angle of the laser beam directed by the one or more sectors units towards the threat located within the respective sector relative to the platform.

6. The LDIRCM system according to claim 1, wherein the at least one threat detection and tracking module is operable for:

implementing a first mode of operation for searching for a signal that includes a signature of a threat directed towards the platform, at a first frame rate and within a first frame, and implementing a second mode operation for tracking the threat detected during the first mode of operation, the second mode of operation including defining a subframe within the first frame around the detected signature of the threat detected during the first mode of operation and sampling the subframe at a second frame rate that is substantially higher than the first frame rate.

7. The LDIRCM system according to claim 1, wherein the at least one threat detection and tracking module is a missile warning system ("MWS").

8. The LDIRCM system according to claim 1, wherein each one of the plurality of operatively independent sector units when mounted on the platform is configurable to provide a jamming capability within a coverage sector that is approximately 90° horizontal to the platform and tens of degrees vertical to the platform.

9. The LDIRCM system according to claim 1, wherein each one of the plurality of operatively independent sector units when mounted on the platform is configurable to provide a jamming capability within a coverage sector that is approximately 60° to the platform and tens of degrees vertical to the platform.

10. The LDIRCM system according to claim 1, wherein the laser guidance module of each sector unit includes one or more beam steering elements rotatable about a first and a second axes, thereby enabling the one or more beam steering elements to steer at least the laser beam generated by the semiconductor laser unit towards the threat, and wherein the plurality of operatively independent sector units are mountable on the platform such that a motion of the one or more beam steering elements of the laser guidance module of each sector unit about the first axis does not cause an orientation of the second axis of the one or more beam steering elements to change with respect to the platform and vice versa.

11. The LDIRCM system according to claim 1, wherein the at least one threat detection and tracking module is operatively associated with a thermoelectric cooler or is not actively cooled at all.

12. The LDIRCM system according to claim 1, wherein the at least one threat detection and tracking module includes a short-wavelength infrared ("SWIR") detector having a cutoff wavelength that is from 1.5 μm-3 μm.

13. The LDIRCM system according to claim 1, further comprising a radar threat detection unit.

14. A laser directed infrared countermeasures ("LDIRCM") system mountable on a platform, comprising:
a plurality of operatively independent sector units each sector unit comprising:
a semiconductor laser unit adapted to produce a beam of infrared laser energy for jamming a guidance system of a threat;
a controller for controlling operation of the semiconductor laser unit and for providing drive signals to the semiconductor laser unit;
a laser guidance module, the laser guidance module being adapted to steer at least the laser beam generated by the semiconductor laser unit towards the threat, thereby enabling jamming of a threat within a certain sector relative to the platform, and
wherein the sector units are mountable on the platform, such that each one of the plurality of operatively independent sector units is configured upon receiving electrical energy to operate independently to provide a jamming capability for a threat located within a respective sector relative to the platform, which results in a combined missile jamming capability that covers substantially the full perimeter of the platform, and wherein the laser guidance module of each sector unit includes one or more beam steering elements rotatable about a first and a second axes, thereby enabling the one or more beam steering elements to steer at least the laser beam generated by the semiconductor laser unit towards the threat, and wherein the plurality of operatively independent sector units are mountable on the platform such that a motion of the one or more beam steering elements of the laser guidance module of each sector unit about the first axis does not cause an orientation of the second axis of the one or more beam steering elements to change with respect to the platform and vice versa.

15. The LDIRCM system according to claim 14, wherein the semiconductor laser unit includes a semiconductor laser that is configurable to provide a laser beam at a wavelength from 3 μm-5 μm.

16. The LDIRCM system according to claim 14, wherein the semiconductor laser unit includes a laser selected from a group consisting of a quantum cascade laser; an interband cascade laser; and an externally pumped semiconductor laser that is configurable to provide a laser beam at a wavelength from 3 μm-5 μm.

17. The LDIRCM system according to claim 14, wherein the at least threat detection and tracking module comprises an array of staring detectors, and wherein the at least one threat detection and tracking module is rigidly attachable to one or more of the plurality of operatively independent sector units while mounted on the platform, such that an angular error between a location of a threat as represented by tracking data provided by the at least one threat detection and tracking module and a centerline of the laser beam directed by the one or more sectors units based upon the tracking data towards the threat as represented by tracking data, is smaller than a far field divergence of the laser beam.

18. The LDIRCM system according to claim 14, wherein the at least one threat detection and tracking module is rigidly attachable to one or more of the plurality of operatively independent sector units while mounted on the platform, such that an instantaneous field of view ("IFOV") of each pixel of the at least one threat detection and tracking module is smaller than a full width half max ("FWHM") far field divergence angle of the laser beam directed by the one or more sectors units towards the threat located within the respective sector relative to the platform.

19. The LDIRCM system according to claim 14, wherein the at least one threat detection and tracking module is operable for:
implementing a first mode of operation for searching for a signal that includes a signature of a threat directed towards the platform, at a first frame rate and within a first frame, and implementing a second mode operation for tracking the threat detected during the first mode of operation, the second mode of operation including defining a subframe within the first frame around the detected signature of the threat detected during the first mode of operation and sampling the subframe at a second frame rate that is substantially higher than the first frame rate.

20. The LDIRCM system according to claim 14, wherein the at least one threat detection and tracking module is a missile warning system ("MWS").

21. The LDIRCM system according to claim 14, wherein each one of the plurality of operatively independent sector units when mounted on the platform is configurable to provide a jamming capability within a coverage sector that is approximately 90° horizontal to the platform and tens of degrees vertical to the platform.

22. The LDIRCM system according to claim 14, wherein each one of the plurality of operatively independent sector units when mounted on the platform is configurable to provide a jamming capability within a coverage sector that is approximately 60° horizontal to the platform and tens of degrees vertical to the platform.

23. The LDIRCM system according to claim 14, wherein the at least one threat detection and tracking module is operatively associated with a thermoelectric cooler or is not actively cooled at all.

24. The LDIRCM system according to claim 14, wherein the at least one threat detection and tracking module includes a short-wavelength infrared ("SWIR") detector having a cut-off wavelength that is from 1.5 μm-3 μm.

25. The LDIRCM system according to claim 14, further comprising a radar threat detection unit.

* * * * *

UNITED STATES PATENT AND TRADEMARK OFFICE
CERTIFICATE OF CORRECTION

| | |
|---|---|
| PATENT NO. | : 7,920,255 B2 |
| APPLICATION NO. | : 12/296441 |
| DATED | : April 5, 2011 |
| INVENTOR(S) | : Ori Aphek et al. |

Page 1 of 1

It is certified that error appears in the above-identified patent and that said Letters Patent is hereby corrected as shown below:

Please change ""LDIRCM")" at column 39, line 62 to "("LDIRCM")"

Please change "60° to the platform" at column 41, line 25 to "60° horizontal to the platform"

Signed and Sealed this
Second Day of August, 2011

David J. Kappos
*Director of the United States Patent and Trademark Office*